US012581508B2

(12) United States Patent　(10) Patent No.:　US 12,581,508 B2
Park et al.　(45) Date of Patent:　Mar. 17, 2026

(54) METHOD AND DEVICE FOR PERFORMING SL DRX OPERATION IN NR V2X ON BASIS OF RESOURCE ALLOCATION INFORMATION

(71) Applicant: LG ELECTRONICS INC., Seoul (KR)

(72) Inventors: Giwon Park, Seoul (KR); Seungmin Lee, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 18/267,385

(22) PCT Filed: Dec. 4, 2021

(86) PCT No.: PCT/KR2021/018994
§ 371 (c)(1),
(2) Date: Jun. 14, 2023

(87) PCT Pub. No.: WO2022/131761
PCT Pub. Date: Jun. 23, 2022

(65) Prior Publication Data
US 2024/0057124 A1　Feb. 15, 2024

(30) Foreign Application Priority Data

| Dec. 14, 2020 | (KR) | .......................... 10-2020-0174418 |
| Dec. 24, 2020 | (KR) | .......................... 10-2020-0183525 |
| Feb. 9, 2021 | (KR) | .......................... 10-2021-0018113 |

(51) Int. Cl.
*H04W 72/25*　(2023.01)
*H04L 1/1812*　(2023.01)
(Continued)

(52) U.S. Cl.
CPC ........... *H04W 72/25* (2023.01); *H04L 1/1812* (2013.01); *H04W 72/12* (2013.01); *H04W 76/28* (2018.02); *H04W 92/18* (2013.01)

(58) Field of Classification Search
CPC ..... H04W 72/25; H04W 72/12; H04W 76/28; H04W 92/18; H04W 52/0216;
(Continued)

(56) References Cited

U.S. PATENT DOCUMENTS

| 2020/0374861 | A1* | 11/2020 | Shilov | ...................... H04W 4/46 |
| 2021/0400762 | A1* | 12/2021 | Jeong | ..................... H04W 24/10 |
| 2022/0022279 | A1* | 1/2022 | Kim | ....................... H04W 72/23 |

FOREIGN PATENT DOCUMENTS

| CN | 111699723 | 9/2020 |
| EP | 4179842 | 5/2023 |

(Continued)

OTHER PUBLICATIONS

PCT International Application No. PCT/KR2021/018994, International Search Report dated Mar. 21, 2022, 3 pages.
(Continued)

*Primary Examiner* — Shawn D Miller
(74) *Attorney, Agent, or Firm* — LEE, HONG, DEGERMAN, KANG & WAIMEY

(57) ABSTRACT

Proposed, in an embodiment, is a method for a first device to perform wireless communication. The method may comprise the steps of: establishing a radio resource control (RRC) connection with a second device; receiving, from the second device, a sidelink discontinuous reception (SL DRX) configuration including information related to an SL DRX cycle and information related to a timer for an active time; starting the timer; receiving first sidelink control information (SCI) for scheduling a physical sidelink shared channel (PSSCH), the first SCI being received from the second
(Continued)

device through a physical sidelink control channel (PSCCH) on the basis of a first resource; and receiving second SCI and data from the second device through the PSSCH on the basis of the first resource. For example, the first SCI may include resource allocation information. For example, the timer may be stopped on the basis of the resource allocation information only including information about the first resource.

14 Claims, 16 Drawing Sheets

(51) Int. Cl.
    *H04W 72/12*      (2023.01)
    *H04W 76/28*      (2018.01)
    *H04W 92/18*      (2009.01)

(58) Field of Classification Search
    CPC ....... H04W 76/14; H04W 4/40; H04W 52/02; H04W 52/0229; H04W 52/0235; H04W 52/028; H04W 72/0446; H04W 72/1263; H04W 72/543; H04W 72/569; H04L 1/1812; H04L 1/188; H04L 1/1896; Y02D 30/70
    See application file for complete search history.

(56) References Cited

FOREIGN PATENT DOCUMENTS

| | | | |
|---|---|---|---|
| KR | 1020200093517 | 8/2020 | |
| WO | 2020218892 | 10/2020 | |
| WO | WO-2021147959 A1 * | 7/2021 | ........... H04W 92/18 |
| WO | 2022010233 | 1/2022 | |

OTHER PUBLICATIONS

Xiaomi, "Discussion on sidelink DRX timer handling," 3GPP TSG-RAN WG2 Meeting #112e, R2-2010468, Oct. 2020, 6 pages.
3rd Generation Partnership Project (3GPP), "Technical Specification Group Radio Access Network; NR; Medium Access Control (MAC) protocol specification (Release 16)," 3GPP TS 38.321 V16.2.0, Oct. 2020, 153 pages.
Lenovo, Motorola Mobility, "Discussion on potential sidelink DRX impacts in RAN1," 3GPP TSG-RAN WG1 #102-e, e-Meeting, R1-2005841, Aug. 2020, 4 pages.
European Patent Office Application Serial No. 21907065.3, Search Report dated Nov. 15, 2024, 10 pages.
LG Electronics Inc., "Discussion on physical layer design considering sidelink DRX operation," 3GPP TSG RAN WG1 #103-e, R1-2007897, Oct. 2020, 15 pages.

\* cited by examiner

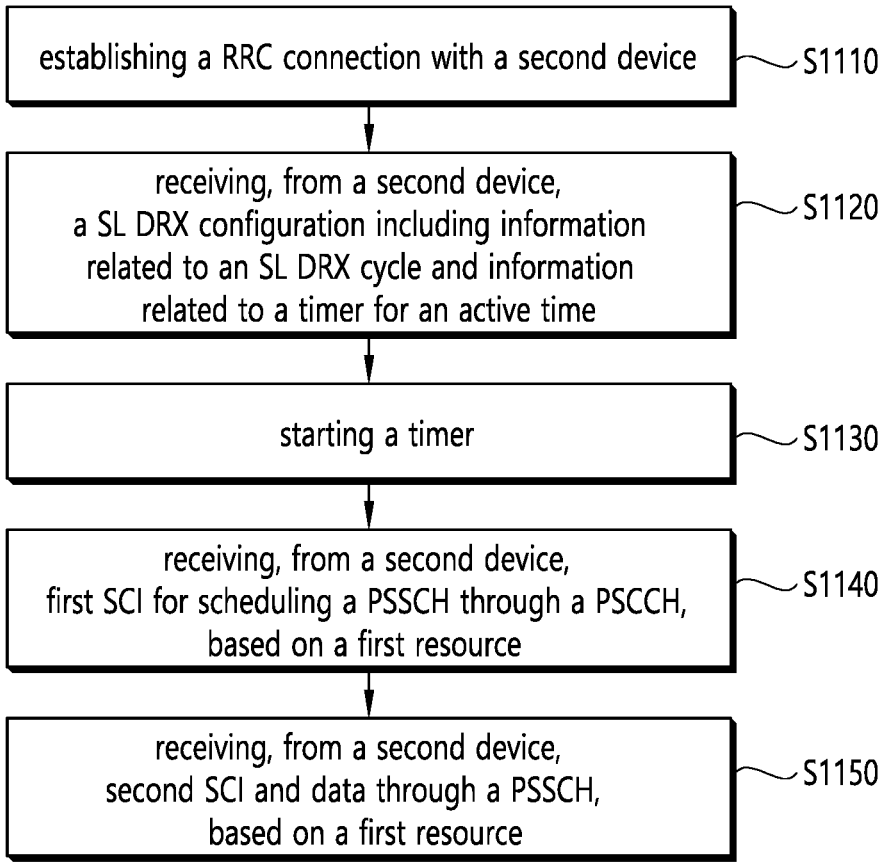

establishing a RRC connection with a second device — S1110 receiving, from a second device,
a SL DRX configuration including information
related to an SL DRX cycle and information
related to a timer for an active time — S1120 starting a timer — S1130 receiving, from a second device,
first SCI for scheduling a PSSCH through a PSCCH,
based on a first resource — S1140 receiving, from a second device,
second SCI and data through a PSSCH,
based on a first resource — S1150

FIG. 13

Device (100,200)

FIG. 18

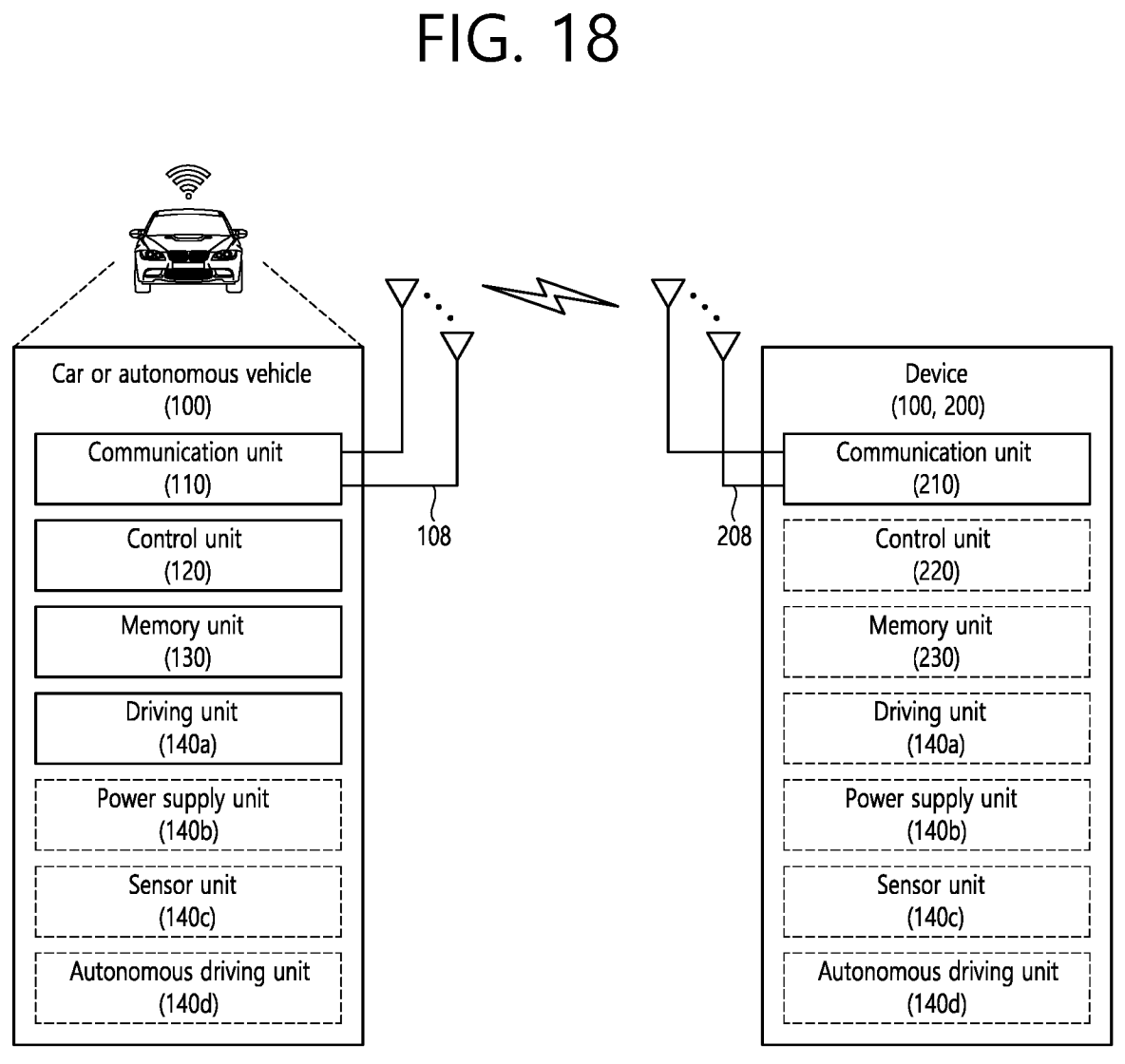

Device (100, 200)

- Communication unit (210)
- Control unit (220)
- Memory unit (230)
- Driving unit (140a)
- Power supply unit (140b)
- Sensor unit (140c)
- Autonomous driving unit (140d)

208

108

Car or autonomous vehicle (100)

- Communication unit (110)
- Control unit (120)
- Memory unit (130)
- Driving unit (140a)
- Power supply unit (140b)
- Sensor unit (140c)
- Autonomous driving unit (140d)

METHOD AND DEVICE FOR PERFORMING SL DRX OPERATION IN NR V2X ON BASIS OF RESOURCE ALLOCATION INFORMATION

CROSS-REFERENCE TO RELATED APPLICATION(S)

This application is the National Stage filing under 35 U.S.C. 371 of International Application No. PCT/KR2021/ 018994, filed on Dec. 14, 2021, which claims the benefit of earlier filing date and right of priority to Korean Application Nos. 10-2020-0174418, filed on Dec. 14, 2020, 10-2020-0183525, filed on Dec. 24, 2020, and 10-2021-0018113 , filed on Feb. 9, 2021, the contents of which are all incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

On the other hand, in sidelink communication, to reduce the power of the UE, the UE may perform a sidelink discontinuous reception (SL DRX) operation. In this case, for example, if a transmitting UE (hereinafter referred to as TX UE) has performed the last physical sidelink control channel/physical sidelink shared channel (PSCCH/PSSCH) transmission to a receiving UE (hereinafter referred to as RX UE), the RX UE may continue to run the timer related to SL DRX because it does not know that the transmission was the last transmission.

Furthermore, for example, a sidelink hybrid automatic repeat request negative-acknowledgement (SL HARQ NACK) for a PSCCH/PSSCH transmitted by a TX UE to an RX UE may occur. In this case, if an RX UE receives a PSCCH/PSSCH after transmitting an SL HARQ NACK to a TX UE, it may cause the timer related to the SL DRX to start despite exceeding the packet delay budget (PDB) related to the PSCCH/PSSCH.

According to an embodiment of the present disclosure, a method for performing, by a first device, wireless communication may be proposed. The method may comprise: establishing a radio resource control (RRC) connection with a second device; receiving, from the second device, a sidelink discontinuous reception (SL DRX) configuration including information related to an SL DRX cycle and information related to a timer for an active time; starting the timer; receiving, from the second device, first sidelink control information (SCI) for scheduling a physical sidelink shared channel (PSSCH) through a physical sidelink control channel (PSCCH), based on a first resource; and receiving, from the second device, second SCI and data through the PSSCH, based on the first resource. For example, the first SCI may include resource allocation information. For example, the timer may be stopped based on the resource allocation information including only information regarding the first resource.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: establish a radio resource control (RRC) connection with a second device; receive, from the second device, a sidelink discontinuous reception (SL DRX) configuration including information related to an SL DRX cycle and information related to a timer for an active time; start the timer; receive, from the second device, first sidelink control information (SCI) for scheduling a physical sidelink shared channel (PSSCH) through a physical sidelink control channel (PSCCH), based on a first resource; and receive, from the second device, second SCI and data through the PSSCH, based on the first resource. For example, the first SCI may include resource allocation information. For example, the timer may be stopped based on the resource allocation information including only information regarding the first resource.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: establish a radio resource control (RRC) connection with a second UE; receive, from the second UE, a sidelink discontinuous reception (SL DRX) configuration including information related to an SL DRX cycle and information related to a timer for an active time; start the timer; receive, from the second UE, first sidelink control information (SCI) for scheduling a physical sidelink shared channel (PSSCH) through a physical sidelink control channel (PSCCH), based on a first resource; and receive, from the second UE, second SCI and data through the PSSCH, based on the first resource. For example, the first SCI may include resource allocation information. For example, the timer may be stopped based on the resource allocation information including only information regarding the first resource.

According to an embodiment of the present disclosure, a non-transitory computer-readable storage medium storing instructions may be proposed. For example, the instructions, when executed, may cause a first device to: establish a radio resource control (RRC) connection with a second device; receive, from the second device, a sidelink discontinuous reception (SL DRX) configuration including information related to an SL DRX cycle and information related to a timer for an active time; start the timer; receive, from the second device, first sidelink control information (SCI) for scheduling a physical sidelink shared channel (PSSCH) through a physical sidelink control channel (PSCCH), based on a first resource; and receive, from the second device, second SCI and data through the PSSCH, based on the first resource. For example, the first SCI may include resource allocation information. For example, the timer may be stopped based on the resource allocation information including only information regarding the first resource.

According to an embodiment of the present disclosure, a method for performing, by a second device, wireless communication may be proposed. The method may comprise: establishing a radio resource control (RRC) connection with a first device; transmitting, to the first device, a sidelink discontinuous reception (SL DRX) configuration including information related to an SL DRX cycle and information related to a timer for an active time, wherein the timer is started by the first device; transmitting, to the first device, first sidelink control information (SCI) for scheduling a physical sidelink shared channel (PSSCH) through a physical sidelink control channel (PSCCH), based on a first resource; and transmitting, to the first device, second SCI and data through the PSSCH, based on the first resource. For example, the first SCI may include resource allocation information. For example, the timer may be stopped by a first device 100, based on the resource allocation information including only information regarding the first resource.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: establish a radio resource control (RRC) connection with a first device; transmit, to the first device, a sidelink discontinuous reception (SL DRX) configuration including information related to an SL DRX cycle and information related to a timer for an active time, wherein the timer is started by the first device; transmit, to the first device, first sidelink control information (SCI) for scheduling a physical sidelink shared channel (PSSCH) through a physical sidelink control channel (PSCCH), based on a first resource; and transmit, to the first device, second SCI and data through the PSSCH, based on the first resource. For example, the timer may be stopped by a first device 100, based on the resource allocation information including only information regarding the first resource.

By checking the last physical sidelink control channel/ physical sidelink shared channel (PSCCH/PSSCH) transmitted by a transmitting UE and stopping the timer related to sidelink discontinuous reception (SL DRX), a receiving UE can effectively save power.

In addition, a receiving UE can efficiently save power by transmitting SL hybrid automatic repeat request (HARQ) feedback and not starting the timer related to SL DRX, taking into account the remaining packet delay budget (PDB).

BRIEF DESCRIPTION OF THE DRAWINGS

FIG. 2 shows a radio protocol architecture, based on an embodiment of the present disclosure.

FIG. 4 shows a structure of a slot of an NR frame, based on an embodiment of the present disclosure.

FIG. 11 shows a method of stopping a timer related to an active time by a first device according to an embodiment of the present disclosure.

Figure 13:
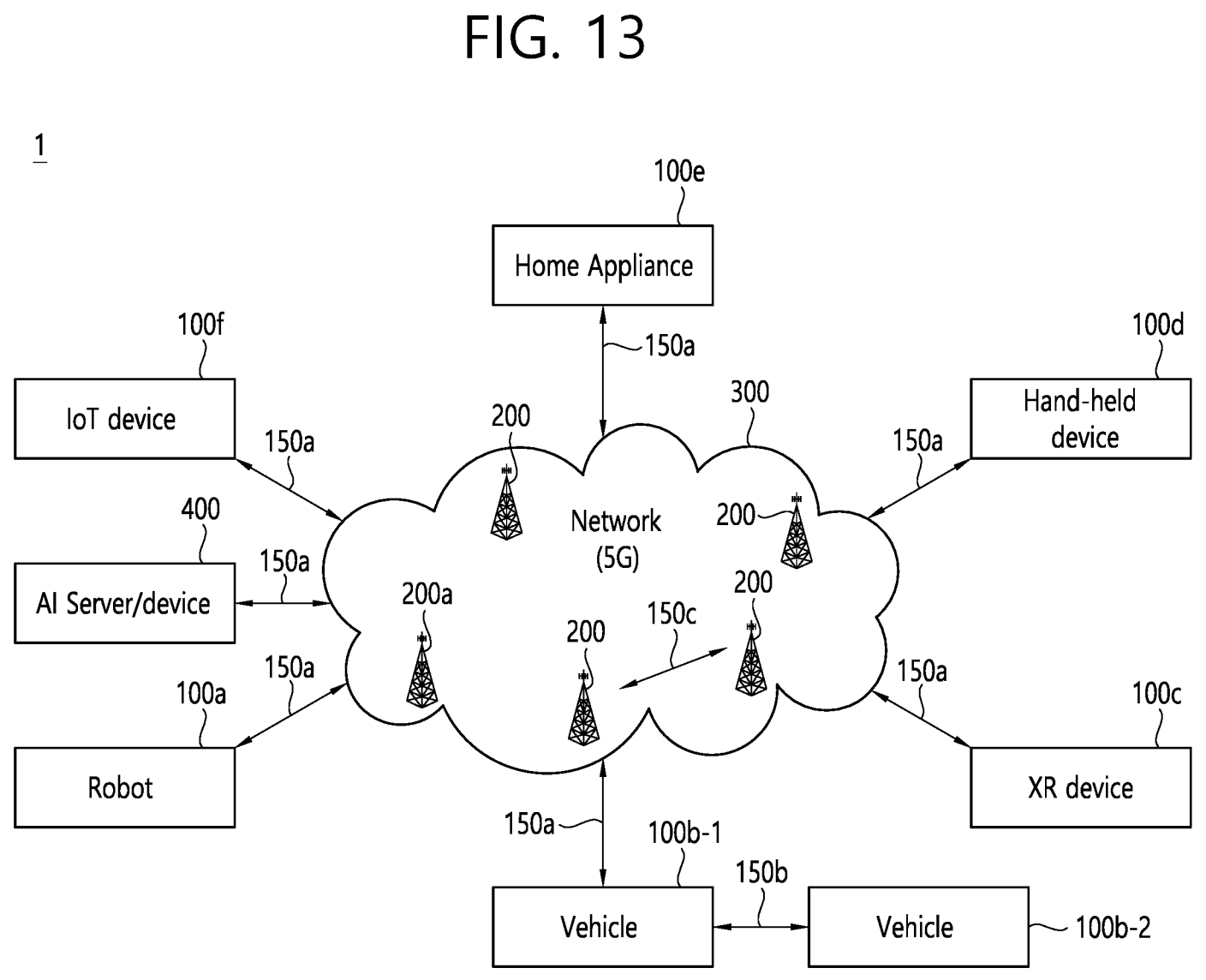

FIG. 13 shows a communication system 1, based on an embodiment of the present disclosure.

FIG. 18 shows a vehicle or an autonomous vehicle, based on an embodiment of the present disclosure.

DETAILED DESCRIPTION

Figure 1:
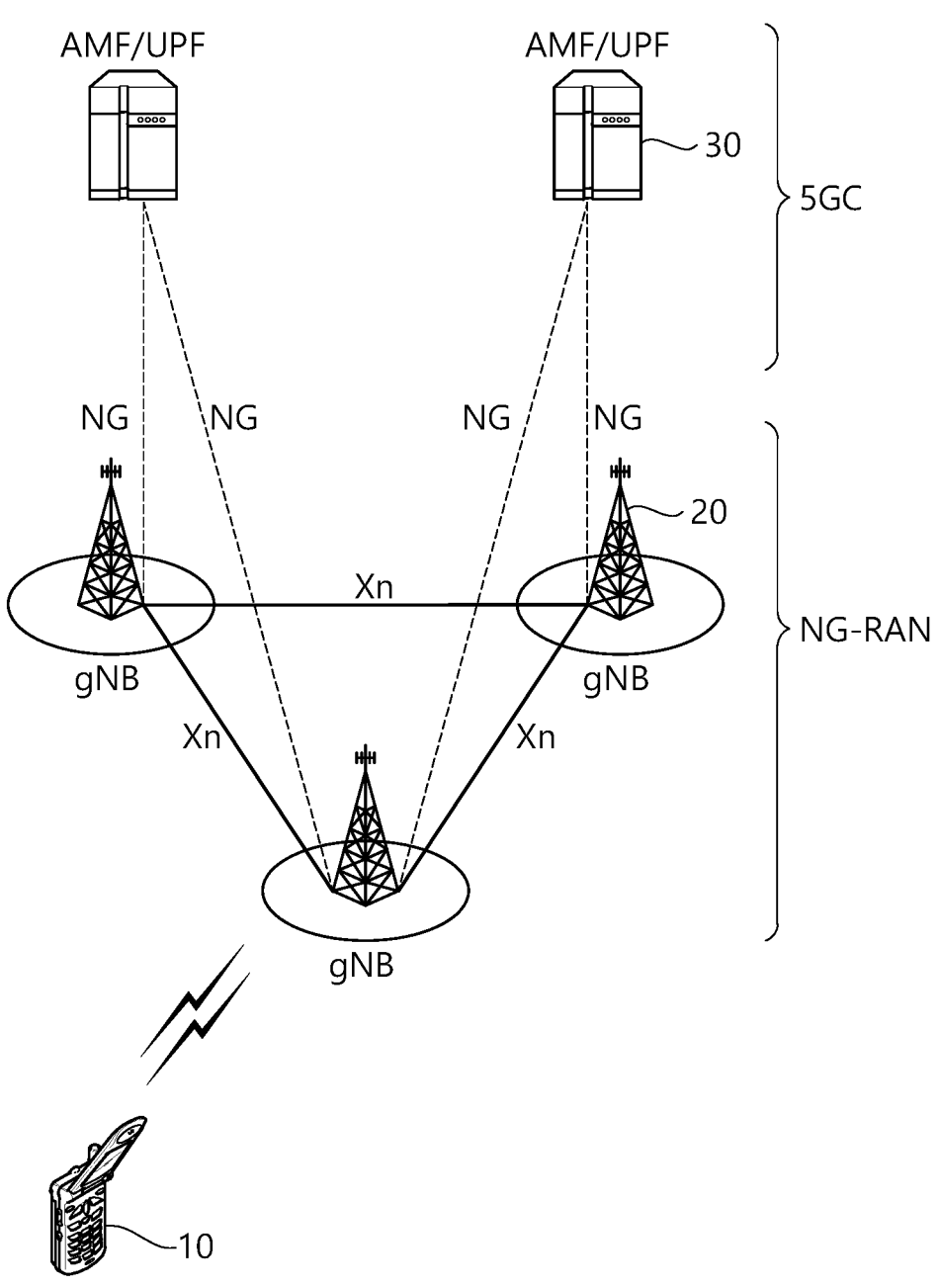
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
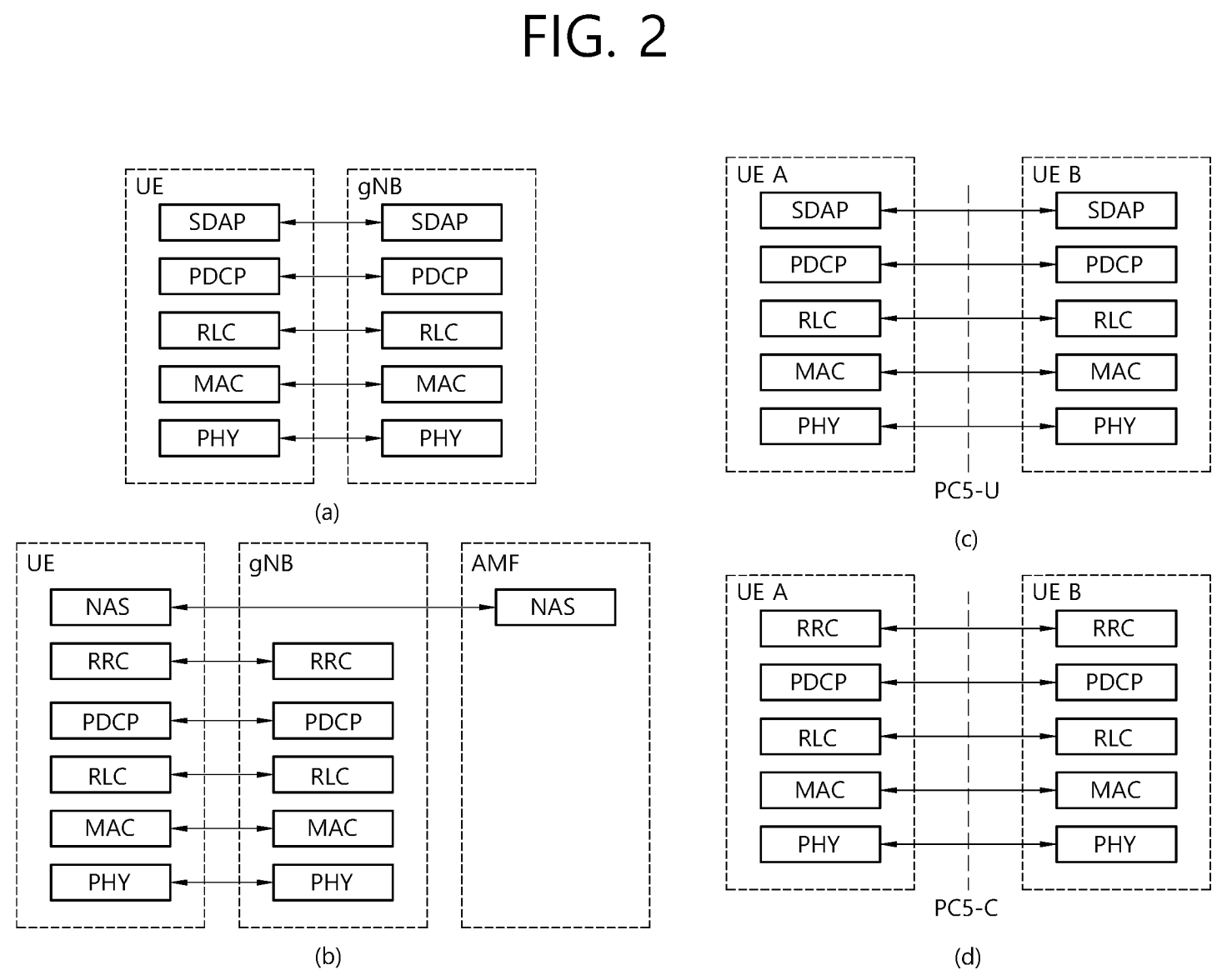

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
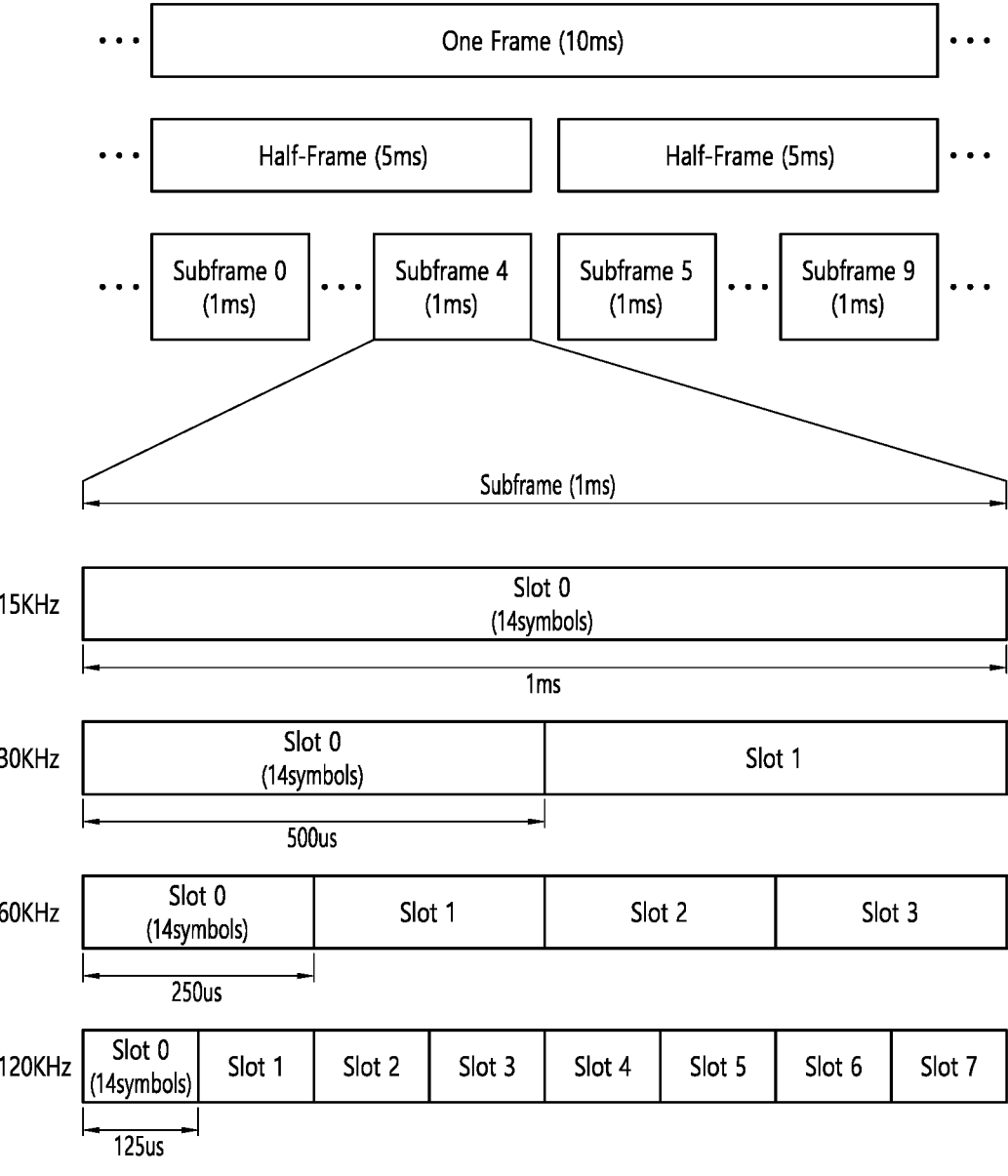
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame,\,u}_{slot}$ | $N^{subframe,\,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame,\,u}_{slot}$ | $N^{subframe,\,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
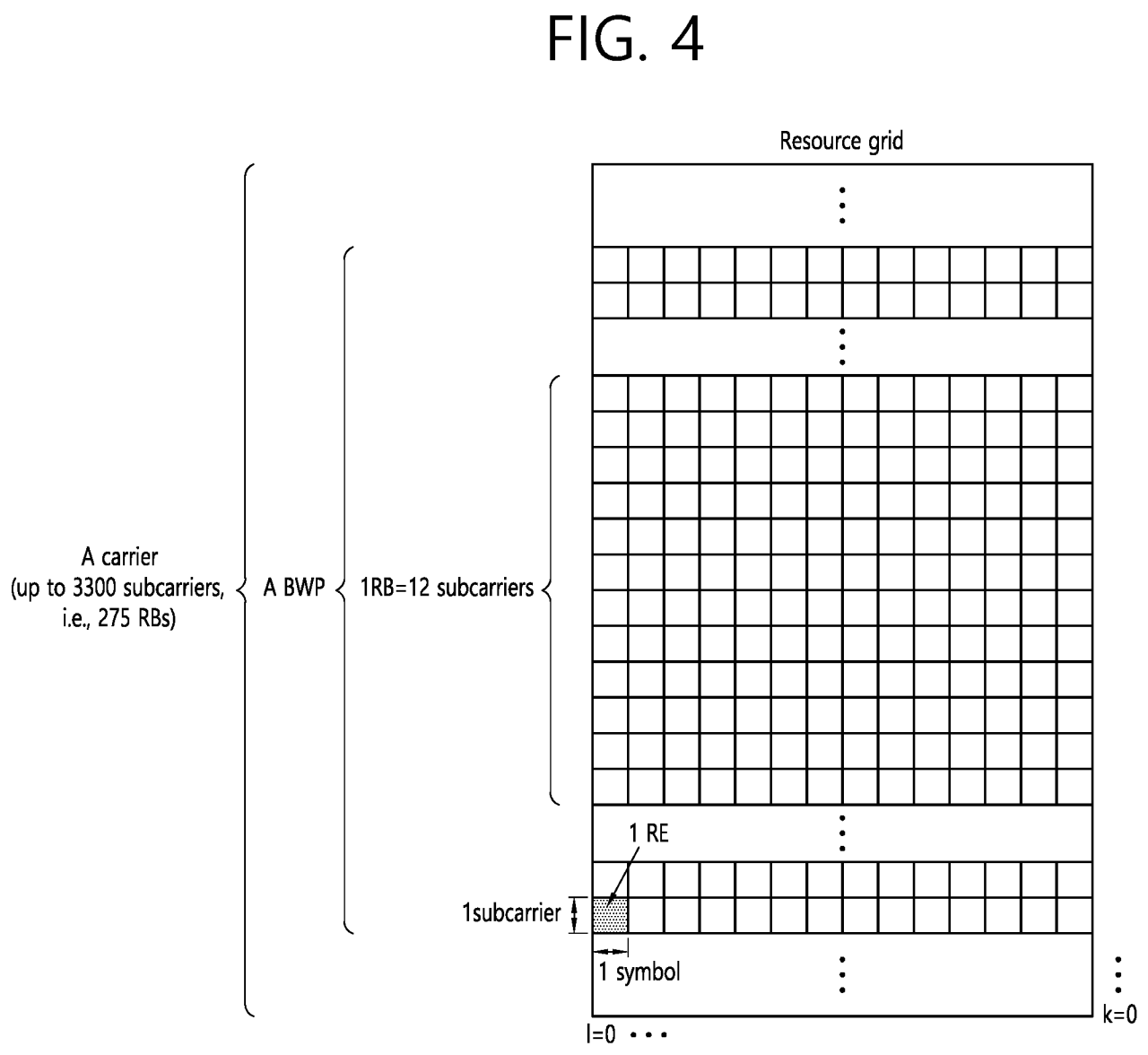

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
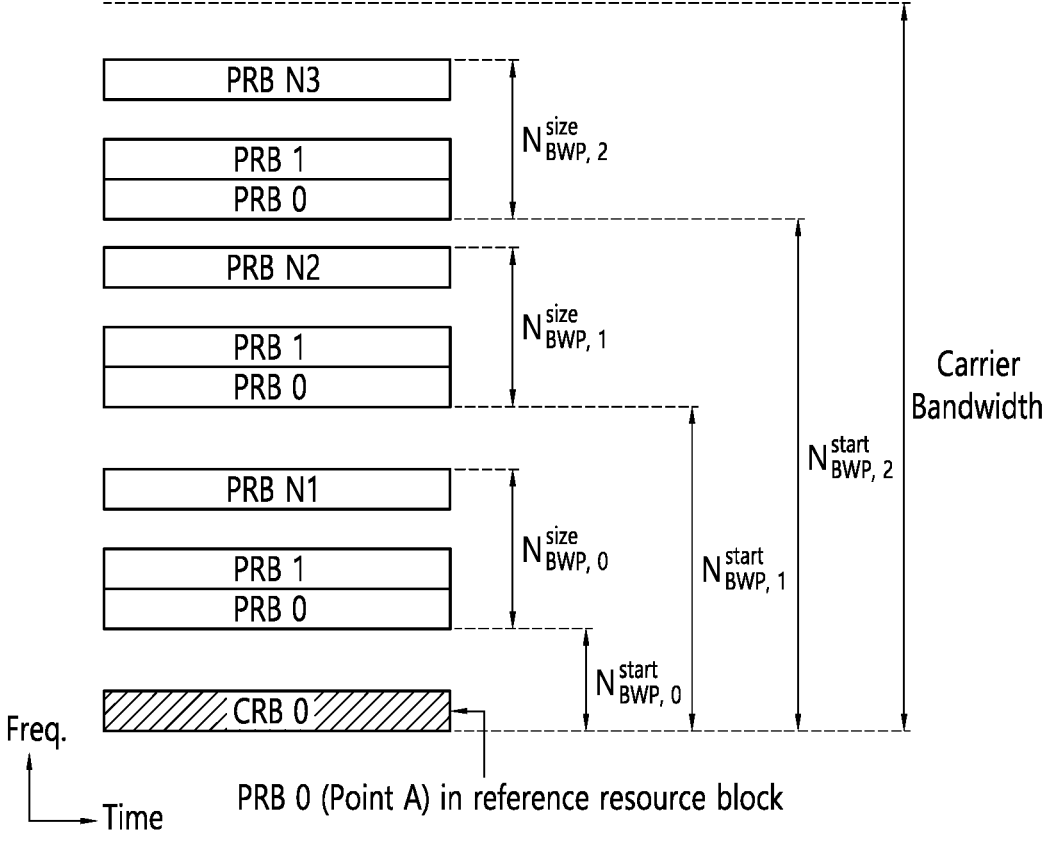
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology. Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PS SS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SS S. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
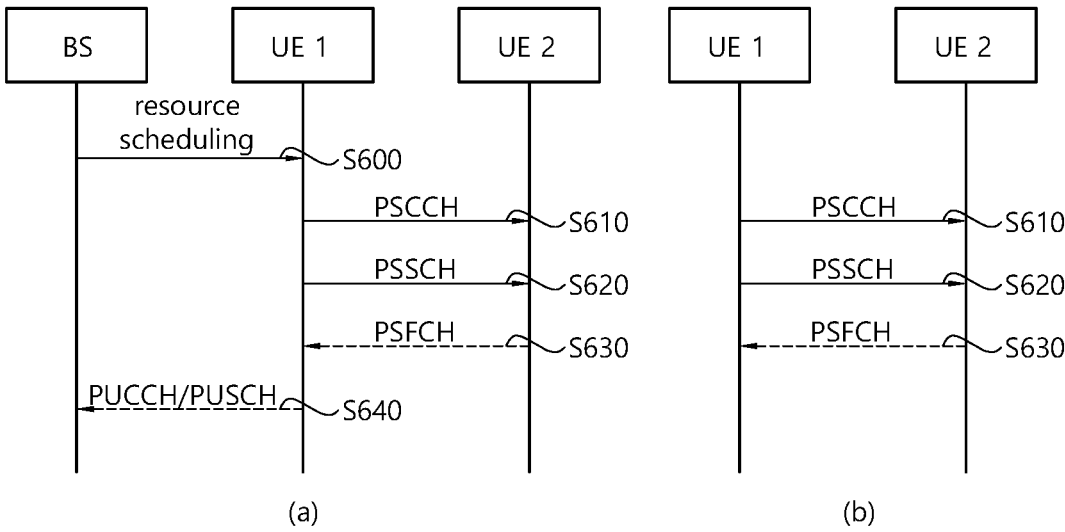
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s)

configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI Resource pool index—ceiling ($\log_2$ I) bits, where I is the number of resource pools for transmission configured by the higher layer parameter sl-TxPoolScheduling.

Time gap—3 bits determined by higher layer parameter sl-DCI-ToSL-Trans

HARQ process number—4 bits.

New data indicator—1 bit.

Lowest index of the subchannel allocation to the initial transmission—ceiling ($\log_2(N^{SL}_{subChannel})$) bits SCI format 1-A field: Frequency resource assignment, Time resource assignment PSFCH-to-HARQ feedback timing indicator—ceiling ($\log_2 N_{fb\_timing}$) bits, where $N_{fb\_timing}$ is the number of entries in the higher layer parameter sl-PSFCH-To-PUCCH, PUCCH resource indicator—3 bits Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits, 2 bits if the UE is configured with pdsch-HARQ-ACK-Codebook=dynamic, 2 bits if the UE is configured with pdsch-HAR Q-ACK-Codebook=semi-static Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling $(\log_2 (N^{SL}_{subChannel}(N^{SL}_{subChannel}+1)/2))$ bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList $2^{nd}$-stage SCI format—2 bits as defined in Table 5

Beta offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described. SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described. SCI format 2-B is used for the decoding of PSSCH, with HARQ operation when HARQ-ACK information includes only NACK, or when there is no feedback of HARQ-ACK information.

In HARQ operation, if the HARQ-ACK information contains only a NACK, or if there is no feedback from the HARQ-ACK information, SCI format 2-B is used to decode the PSSCH.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource. Referring to (a) of FIG. 6, in step S640, the first UE may transmit SL HARQ feedback to the base station through the PUCCH and/or the PUSCH.

Hereinafter, a UE procedure for reporting HARQ-ACK in the sidelink will be described.

A UE can be indicated by an SCI format scheduling a PSSCH reception, in one or more sub-channels from a number of $N^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_{k}$ ($0 \le k < T'_{max}$) has a PSFCH transmission occasion resource if k mod $N^{PSFCH}_{PSSCH}=0$, where $t'^{SL}_{k}$ is a slot that belongs to the resource pool, $T'_{max}$ is a number of slots that belong to resource pool within 10240 msec, and $N^{PSFCH}_{PSSCH}$ is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the [(i+j·$N^{PFSCH}_{PSSCH}$)·$M^{PSFCH}_{subch,slot}$, (i+1+j·$N^{PFSCH}_{PSSCH}$)·$M^{PSFCH}_{subch,slot}-1$]

PRBs from the $M^{PSFCH}_{PRB,set}$ PRBs to slot i among the PSSCH slots associated with the PSFCH slot and sub-channel j, where $M^{PSFCH}_{subch,slot}=M^{PSFCH}_{PRB,set}/(N_{subch}·N^{PSFCH}_{PSSCH})$, $0 \le i < N^{PSFCH}_{PSSCH}$, $0 \le j < N_{subch}$, and the allocation starts in an ascending order of i and continues in an ascending order of j. The UE expects that $M^{PSFCH}_{PRB,set}$ is a multiple of $N_{subch}·N^{PSFCH}_{PSSCH}$.

A UE determines a number of PSFCH resources available for multiplexing HARQ-ACK information in a PSFCH transmission as $R^{PSFCH}_{PRB,CS}=N^{PSFCH}_{type}·M^{PSFCH}_{subch,slot}·N^{PSFCH}_{CS}$ where $N^{PSFCH}_{CS}$ is a number of cyclic shift pairs for the resource pool and, based on an indication by higher layers, $N^{PSFCH}_{type}=1$ and the $M^{PSFCH}_{subch,slot}$ PRBs are associated with the starting sub-channel of the corresponding PSSCH $N^{PSFCH}_{type}=N^{PSSCH}_{subch}$ and the $N^{PSSCH}_{subch}·M^{PSFCH}_{subch,slot}$ PRBs are associated with one or more sub-channels from the $N^{PSSCH}_{subch}$ sub-channels of the corresponding PSSCH The PSFCH resources are first indexed according to an ascending order of the PRB index, from the $N^{PSFCH}_{type}·M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID}+M_{ID})$ mod $R^{PSFCH}_{PRB,CS}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift $\alpha$, from a cyclic shift pair index corresponding to a PSFCH resource index and from $N^{PSFCH}_{CS}$ using Table 8.

TABLE 8

| | $m_0$ | | | | | |
|---|---|---|---|---|---|---|
| $N^{PSFCH}_{CS}$ | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift $\alpha$, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

TABLE 9

| HARQ-ACK Value | 0 (NACK) | 1 (ACK) |
|---|---|---|
| Sequence cyclic shift | 0 | 6 |

TABLE 10

| HARQ-ACK Value | 0 (NACK) | 1 (ACK) |
|---|---|---|
| Sequence cyclic shift | 0 | N/A |

Figure 7:
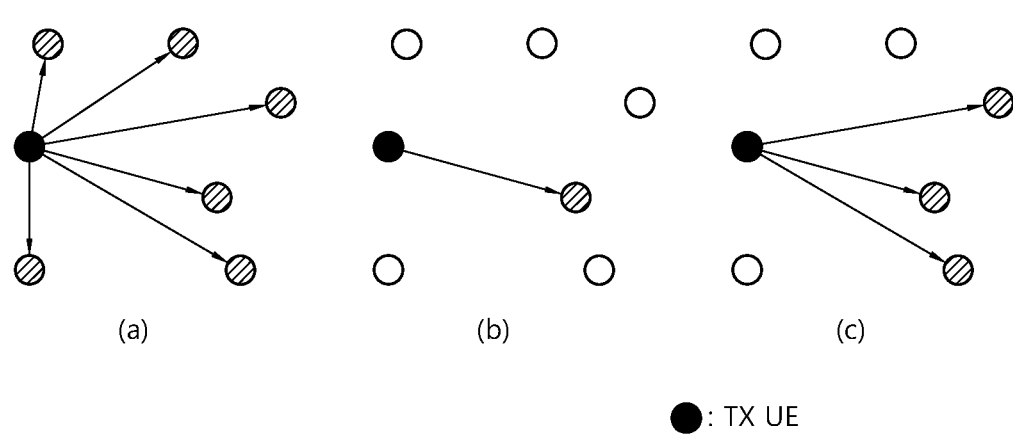
FIG. 7 shows three cast types, based on an embodiment of the present disclosure.

FIG. 7 shows three cast types, in accordance with an embodiment of the present disclosure. The embodiment of FIG. 7 may be combined with various embodiments of the present disclosure. Specifically, FIG. 7(*a*) shows broadcast-type SL communication, FIG. 7(*b*) shows unicast type-SL communication, and FIG. 7(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

For example, an SL DRX configuration may include one or more of the information listed below.

For example, SL drx-onDurationTimer may be information regarding the duration at the beginning of a DRX Cycle. For example, the duration at the beginning of a DRX Cycle may be information regarding the duration during which a UE is operating in active mode to transmit or receive sidelink data.

For example, SL drx-SlotOffset may be information regarding the delay before starting a drx-onDurationTimer.

For example, SL drx-InactivityTimer may be information regarding the duration after the PSCCH occasion in which a PSCCH indicates a new sidelink transmission and sidelink reception for the MAC entity. For example, if a transmitting UE is indicated to transmit of a PSSCH via a PSCCH, the transmitting UE may transmit the PSSCH to a receiving UE by operating in active mode while the SL drx-Inactivity-Timer is operating. Further, for example, if a receiving UE is indicated to transmit a PSSCH by the transmitting UE through the receipt of a PSCCH, the receiving UE may receive the PSSCH from the transmitting UE by operating in the active mode while the SL drx-InactivityTimer is operating.

For example, SL drx-RetransmissionTimer may be information regarding the maximum duration until a retransmission is received. For example, the SL drx-Retransmission Timer may be set per HARQ process.

For example, SL drx-LongCycleStartOffset may be information regarding the Long DRX cycle and drx-StartOffset which defines the subframe where the Long and Short DRX Cycle starts.

For example, SL drx-ShortCycle may be information regarding the Short DRX cycle. For example, SL drx-ShortCycle may be optional information.

For example, SL drx-ShortCycleTimer may be information regarding the duration the UE shall follow the Short DRX cycle. For example, SL drx-ShortCycleTimer may be optional information.

For example, SL drx-HARQ-RTT-Timer may be information regarding the minimum duration before an assignment for HARQ retransmission is expected by the MAC entity. For example, the SL drx-HARQ-RTT-Timer may be set per HARQ process.

On the other hand, NR V2X in release 16 did not support power saving operation of user equipment (UE), and NR V2X in release 17 may support power saving operation of UEs (e.g., power saving UEs).

For example, the UE may perform sidelink DRX operation based on a sidelink (SL) discontinuous reception (DRX) pattern (e.g., DRX Cycle, DRX On-duration, DRX Off-duration) to perform power saving operation. For example, for SL DRX operation, an SL DRX Configuration (e.g., SL DRX Cycle, SL DRX On-duration, SL DRX Off-duration, timer to support SL DRX operation, etc.) to be used by a Power Saving UE (P-UE) needs to be defined. In addition, the operation of the transmitting and receiving UEs needs to be defined in the on-duration (the period during which sidelink reception/transmission can be performed)/off-duration (the period during which they operate in sleep mode).

In various embodiments of the present disclosure, a transmitting UE (hereinafter, TX UE) may transmit assistance information to a peer receiving UE (hereinafter, RX UE). For example, it is proposed that an RX UE performs an SL DRX operation by referring to assistance information received from a TX UE. In the following description, "when, if, in case of" may be replaced by "based on".

In the following description, the names of the timers (Uu DRX HARQ RTT TimerSL, Uu DRX Retransmission TimerSL, etc.) are exemplary, and timers that perform the same/similar functions based on what is described in each timer can be considered the same/similar timer regardless of the name.

According to one embodiment of the present disclosure, if the RX UE receives a PSCCH/PSSCH from the TX UE in its SL DRX on-duration, the RX UE may start an SL DRX Inactivity timer (e.g., a timer that extends the DRX on-duration or Active Time by the timer time), and the RX UE may extend the SL DRX on-duration. For example, the TX UE may transmit to the RX UE a packet delay budget (PDB) value for a transport block (TB) that it transmits to the RX UE via at least one of an SCI, a PC5 RRC message, or a MAC CE. For example, in an SL DRX on-duration timer interval or Active Time interval of the RX UE, when the RX UE receives a PSCCH/PSSCH transmitted by the TX UE, the RX UE may trigger a timer that extends the SL DRX Inactivity timer or Active Time, and extends the on-duration interval. The RX UE may then monitor the PSCCH/PSSCH transmitted by the TX UE during the extended on-duration period. For example, if the RX UE receives a PSCCH/PSSCH (e.g., TB) transmitted by the TX UE and a SL HARQ NACK for the PSCCH/PSSCH (e.g., TB) occurs, the RX UE may calculate the remaining PDB for the TB in which the SL HARQ NACK occurred. If the RX UE determines that even if it transmits an SL HARQ NACK to the TX UE and receives the retransmitted TB, the remaining PDB will not be satisfied, the RX UE may not trigger the SL DRX Inactivity timer. And, for example, the RX UE may transition to sleep mode for SL DRX when its SL DRX on-duration timer interval (or Active Time interval) expires.

Furthermore, for example, if an RX UE receives a PSCCH/PSSCH (e.g., TB) transmitted by a TX UE and a SL HARQ NACK occurs, the RX UE may calculate the remaining PDB for the TB in which the SL HARQ NACK occurred. If the RX UE determines that even if it transmits an SL HARQ NACK to the TX UE and receives the retransmitted TB, the remaining PDB will not be satisfied, the RX UE may transmit an SL HARQ ACK to the TX UE without triggering an SL DRX Inactivity timer. This allows the base station to no longer allocate retransmission resources for the TX UE's retransmission.

The above embodiments may be applied to SL unicast transmission, groupcast, or broadcast transmission between a pair of UEs that have established a PC5 unicast link.

According to one embodiment of the present disclosure, when the RX UE receives a PSCCH/PSSCH from the TX UE, fails to decode the PSCCH/PSSCH, and transmits a SL HARQ NACK to the TX UE, the RX UE may start the SL DRX HARQ round trip time (RTT) timer and operate in SL DRX sleep mode. For example, the SL DRX HARQ RTT timer may be a timer that determines that a retransmission packet from the TX UE will not come before the timer expires, and causes it to operate in SL sleep mode until the timer expires. Also, for example, the RX UE may transition to Active Mode upon expiration of the SL DRX HARQ RTT timer, start the SL DRX Retransmission timer, and monitor the retransmission TBs transmitted by the TX UE. For example, the SL DRX retransmission timer may be a timer that determines that the TX UE will transmit a retransmission TB and causes monitoring of the retransmission TB to be performed for a maximum amount of time, or for the duration of the timer, that the TX UE waits for the retransmission TB.

For example, a TX UE may transmit the PDB value for a TB that it transmits to an RX UE via at least one of SCI, PC5 RRC message, or MAC CE to the RX UE. For example, after the RX UE receives a PSCCH/PSSCH from the TX UE and fails to decode a PSCCH/PSSCH, but before transmitting a SL HARQ NACK to the TX UE, the RX UE may calculate or determine the Remaining PDB of the TB in which the SL HARQ NACK occurred. For example, if the RX UE transmits a SL HARQ NACK to the TX UE and receives the next retransmission TB, the RX UE may determine whether the Remaining PDB is exceeded or not. For example, if the RX UE determines that the Remaining PDB cannot be satisfied, the RX UE may not transmit an SL HARQ NACK to the TX UE, but may transmit an SL HARQ ACK. In this case, for example, the RX UE may not start the SL DRX HARQ RTT timer and the SL DRX Retransmission timer to transmit the SL HARQ ACK.

Furthermore, for example, the RX UE may operate in the Active Time during the off-duration period of the SL DRX cycle to receive the retransmitted TB. In this case, for example, the RX UE may calculate the remaining PDB of the TB in which the SL HARQ NACK occurred before transmitting the SL HARQ NACK after failing to decode the PSCCH/PSSCH. Subsequently, for example, when the RX UE transmits the SL HARQ NACK to the TX UE and receives the next retransmitted TB, the RX UE may determine that the PDB cannot be satisfied because it exceeds the Remaining PDB. The RX UE may immediately operate in SL DRX sleep mode without starting the SL DRX HARQ RTT timer and the SL DRX Retransmission timer. Here, for example, the off-duration period may be a period during which the SL DRX may operate in SL sleep mode. For example, the active time may be the time to monitor the PSCCH/PSSCH transmitted by the TX UE. Alternatively, for example, the RX UE may operate in the Active Time during the off-duration period of the SL DRX cycle, receiving the retransmission TB and transmitting the SL HARQ feedback. For example, after failing to decode the PSCCH/PSSCH, the RX UE may calculate the remaining PDB of the TB in which the SL HARQ NACK occurred before transmiting the SL HARQ NACK. Subsequently, for example, when the RX UE transmits the SL HARQ NACK to the TX UE and receives the next retransmitted TB, the RX UE may determine that the PDB cannot be satisfied because it exceeds the Remaining PDB. In this case, the RX UE may, for example, transmit a SL HARQ ACK to cause the TX UE to not transmit any more retransmission TBs. The RX UE may immediately operate in SL DRX sleep mode without starting the SL DRX HARQ RTT timer and the SL DRX Retransmission timer.

The above embodiments may be applied to SL unicast transmission, groupcast, or broadcast transmission between a pair of UEs that have established a PC5 unicast link.

According to one embodiment of the present disclosure, when an RX UE receives a PSCCH/PSSCH from a TX UE in its SL DRX on-duration, the RX UE may start an SL DRX Inactivity timer (e.g., a timer that extends the DRX on-duration or Active Time by the timer time) and extend the SL DRX on-duration. For example, the TX UE may transmit a Last transmission Indication to the RX UE via SCI, PC5 RRC message, or MAC CE for the TB it is transmitting to the RX UE. Here, for example, the last transmission indication may include the last retransmission indication. For example, the last transmission indication may be information that informs the RX UE that this is the last transmission of the current TB. For example, the last transmission indication may be information related to the last transmission.

For example, if an RX UE receives a PSCCH/PSSCH transmitted by a TX UE during its SL DRX on-duration timer interval or Active Time interval, the RX UE may trigger the SL DRX Inactivity timer (e.g., a timer that extends the DRX on-duration or Active Time by the timer time) and extend the on-duration interval. This allows the RX UE to monitor the PSCCH/PSSCH transmitted by the TX UE.

According to one embodiment of the present disclosure, when an RX UE receives the last PSCCH/PSSCH transmitted by a TX UE and a SL HARQ NACK occurs, the RX UE may determine that it is the last transmission via the last transmission indication included in the SCI and may not trigger the SL DRX Inactivity timer. Then, when the RX UE's own SL DRX on-duration timer interval or Active Time interval expires, the RX UE may transition to SL DRX sleep mode. Alternatively, for example, when the TX UE transmits the last PSCCH/PSSCH for the TB it is transmitting, it may transmit information indicating to operate in SL sleep mode (e.g., a Go-To-Sleep Indication) to the RX UE through at least one of the SCI, MAC CE, or PC5 RRC messages, instead of the last transmission indication. In this case, the RX UE may operate in SL sleep mode without triggering the SL DRX Inactivity timer.

The above embodiments may be applied to SL unicast transmission, groupcast, or broadcast transmission between a pair of UEs that have established a PC5 unicast link.

For example, the SCI including the last transmission indication may include information related to the SL service. For example, to prevent a counterpart UE (e.g., the UE receiving the SCI including the last transmission indication) from stopping or starting timers related to SL DRX (e.g., SL DRX on-duration timer, SL DRX inactivity timer, SL DRX HARQ RTT timer, or SL DRX retransmission timer), when the UE transmits the last transmission indication via SCI, the UE may include information related to the "sidelink service" to allow the UE to stop only the SL DRX timers related to the specific sidelink service. For example, the information related to the sidelink service may include at least one of the following: a PC5 5G QoS Indicator (PQI) related to the sidelink service, a PC5 QoS Flow Identifier (PFI) related to the sidelink service, or an SL Priority related to the sidelink service.

For example, the SCI including the last transmission indication may include information regarding the duration of time to operate in SL sleep mode. For example, to prevent a counterpart UE (e.g., the UE receiving the SCI including the last transmission indication) from stopping or starting a timer related to SL DRX (e.g., the SL DRX on-duration timer, the SL DRX inactivity timer, the SL DRX HARQ RTT timer, or the SL DRX retransmission timer), when the UE transmits the last transmission indication in the SCI, the UE may also transmit information regarding the duration of the SL sleep mode. In this case, for example, if the RX UE operates in SL sleep mode without stopping or starting the SL DRX timer, the RX UE may operate in the SL sleep mode state for the duration of the SL sleep mode operation.

For example, the last transmission indication included in the SCI may be indicated by at least one of a PC5 unicast link, a PC5 RRC connection, or a source/destination pair. For example, the last transmission indication included in the SCI may be determined based on at least one of a PC5 unicast link, a PC5 RRC connection, or a source/destination pair. For example, to stop or not start a timer related to SL DRX (e.g., SL DRX on-duration timer, SL DRX inactivity timer, SL DRX HARQ RTT timer, or SL DRX retransmission timer) related to a Specific PC5 Unicast Link, The UE may transmit at least one of "a specific PC5 unicast link identifier, an L1 source layer ID, an L1 destination layer ID, or cast type information" with the last transmission indication.

For example, the last transmission indication included in SCI may be indicated per destination. For example, the last transmission indication included in the SCI may be determined based on the destination, i.e., to ensure that only timers related to the SL DRX related to a specific destination are stopped or not started, the UE may transmit "L1 Destination Layer ID information" with the last transmission indication.

For example, the last transmission indication included in the SCI may be indicated per HARQ process ID or per SL process. For example, the last transmission indication included in the SCI may be determined based on at least one of the HARQ process ID or SL process, i.e., to ensure that only the timer related to the SL DRX related to a specific HARQ process or a specific SL process is stopped and/or not started, the UE may transmit the "HARQ process ID or SL process ID" information with the last transmission indication.

For example, the last transmission indication may be transmitted explicitly in the SCI and implicitly through the information included in the SCI. For example, the RX UE may check the transmission resource information reserved by the TX UE included in the received SCI. If only resources for the current PSSCH are reserved, the RX UE may determine that the transmission of the PSSCH related to the SCI is the last transmission. Thereafter, for example, the RX UE may stop or not start timers related to the currently operating SL DRX (e.g., SL DRX on-duration timer, SL DRX inactivity timer, SL DRX HARQ RTT timer, or SL DRX retransmission timer) and operate in SL sleep mode. For example, the transmission resource information reserved by the TX UE included in the SCI may include reservation information for up to two or three transmission resources. For example, based on the fact that the transmission resource information reserved by the TX UE included in the SCI includes only reservation information for resources for the current PSSCH, the RX UE may determine that the transmission of the PSSCH related to the SCI is the last transmission. For example, based on the transmission being the last PSSCH transmission, the RX UE may not start the timer related to the SL DRX if the timer related to the SL DRX has not been started. Based on the transmission being the last PSSCH transmission, the RX UE may stop the timer related to the currently operating SL DRX and operate in SL sleep mode. At this time, the RX UE may determine the transmission to be the last transmission for one HARQ process or one SL process.

On the other hand, for example, if an RX UE receives a PSCCH/PSSCH from a TX UE, fails to decode the PSCCH/PSSCH, and then transmits an SL HARQ NACK to the TX UE, the RX UE may start an SL DRX HARQ round trip time (RTT) timer and operate in SL DRX sleep mode. For example, the SL DRX HARQ RTT timer may be a timer that determines that a retransmission packet from the TX UE will not come before the timer expires, and causes it to operate in SL sleep mode until the timer expires. Also, for example, the RX UE may transition to Active Mode upon expiration of the SL DRX HARQ RTT timer, start the SL DRX Retransmission timer, and monitor the retransmission TBs transmitted by the TX UE. For example, the SL DRX retransmission timer may be a timer that determines that the TX UE will transmit a retransmission TB and causes monitoring of the retransmission TB to be performed for a maximum amount of time, or for the duration of the timer, that the TX UE waits for the retransmission TB.

At this time, according to one embodiment of the present disclosure, a TX UE may transmit, to an RX UE, a last transmission indication for the TB it is transmitting to the RX UE, via SCI, PC5 RRC message, or MAC CE. Here, for example, the last transmission indication may include the last retransmission indication. For example, the last transmission indication may be information that informs the RX UE that this is the last transmission of the current TB. For example, the last transmission indication may be information related to the last transmission.

For example, if an RX UE receives a PSCCH/PSSCH from a TX UE, fails to decode the PSCCH/PSSCH, and then an SL HARQ NACK occurs, upon receiving the last transmission indication for the corresponding PSSCH (e.g., TB) via PSCCH (e.g., SCI), the RX UE may not start the SL DRX HARQ RTT timer and the SL DRX retransmission timer. For example, the RX UE may operate in the Active Time during the off-duration period of the SL DRX cycle to receive a retransmission TB. Then, when the RX UE receives the last transmission indication for that PSSCH (e.g., TB) via PSCCH (e.g., SCI) from the TX UE, the RX UE may immediately operate in SL DRX sleep mode without starting the SL DRX HARQ RTT timer and the SL DRX retransmission timer. For example, the RX UE may operate as the Active Time during the off-duration period of the SL DRX cycle to receive a retransmission TB and transmit SL HARQ feedback. When the RX UE receives the last transmission indication for the corresponding PSSCH (e.g., TB) via PSCCH (e.g., SCI) from the TX UE, the RX UE may immediately operate in SL DRX sleep mode without starting the SL DRX HARQ RTT timer and the SL DRX retransmission timer. Here, for example, the off-duration period may be a period during which the RX UE may operate in SL sleep mode. For example, the active time may be the time to monitor a PSCCH/PSSCH transmitted by the TX UE.

Alternatively, for example, when transmitting the last PSCCH/PSSCH for a TB transmitted by the TX UE, it may transmit information (e.g., a Go-To-Sleep Indication) to the RX UE through at least one of the SCI, MAC CE, or PC5 RRC messages indicating to operate in SL sleep mode, instead of the last transmission indication. In this case, the RX UE may operate in SL sleep mode without starting the SL DRX HARQ RTT timer and the SL DRX retransmission timer. Here, for example, the SL sleep mode may be a sleep mode for the SL DRX.

The above embodiments may be applied to SL unicast transmissions, groupcasts, or broadcast transmissions between a pair of UEs that have established a PC5 unicast link.

For example, the SCI including the last transmission indication may include information related to the SL service. For example, to prevent a counterpart UE (e.g., the UE receiving the SCI including the last transmission indication) from stopping or starting timers related to SL DRX (e.g., SL DRX on-duration timer, SL DRX inactivity timer, SL DRX HARQ RTT timer, or SL DRX retransmission timer), when the UE transmits the last transmission indication via SCI, the UE may include information related to the "sidelink service" to allow the UE to stop only the SL DRX timers related to the specific sidelink service. For example, the information related to the sidelink service may include at least one of the following: a PC5 5G QoS Indicator (PQI) related to the sidelink service, a PC5 QoS Flow Identifier (PFI) related to the sidelink service, or an SL Priority related to the sidelink service.

For example, the SCI including the last transmission indication may include information regarding the duration of time to operate in SL sleep mode. For example, to prevent a counterpart UE (e.g., the UE receiving the SCI including the last transmission indication) from stopping or starting a timer related to SL DRX (e.g., the SL DRX on-duration timer, the SL DRX inactivity timer, the SL DRX HARQ RTT timer, or the SL DRX retransmission timer), when the UE transmits the last transmission indication in the SCI, the UE may also transmit information regarding the duration of the SL sleep mode. In this case, for example, if the RX UE operates in SL sleep mode without stopping or starting the SL DRX timer, the RX UE may operate in the SL sleep mode state for the duration of the SL sleep mode operation.

For example, the last transmission indication included in the SCI may be indicated through at least one of a PC5 unicast link, a PC5 RRC connection, or a source/destination pair. For example, the last transmission indication included in the SCI may be determined based on at least one of a PC5 unicast link, a PC5 RRC connection, or a source/destination pair. For example, to stop or not start a timer related to SL DRX (e.g., SL DRX on-duration timer, SL DRX inactivity timer, SL DRX HARQ RTT timer, or SL DRX retransmission timer) related to a Specific PC5 Unicast Link, the UE may transmit at least one of "a specific PC5 unicast link identifier, an L1 source layer ID that can distinguish the unicast link, an L1 destination layer ID, or cast type information" together.

For example, the last transmission indication included in the SCI may be indicated per destination. For example, the last transmission indication included in the SCI may be determined based on the destination, i.e., to ensure that only timers related to the SL DRX related to a specific destination are stopped or not started, the UE may transmit "L1 Destination Layer ID information" with the last transmission indication.

For example, the last transmission indication included in the SCI may be indicated per HARQ process ID or per SL process. For example, the last transmission indication included in the SCI may be determined based on at least one of the HARQ process ID or SL process, i.e., to ensure that only the timer related to the SL DRX related to a specific HARQ process or a specific SL process is stopped and/or not started, a UE may transmit the "HARQ process ID or SL process ID" information with the last transmission indication.

For example, the last transmission indication may be transmitted explicitly in the SCI and implicitly through the information included in the SCI. For example, the RX UE may check the transmission resource information reserved by the TX UE included in the received SCI. If only resources for the current PSSCH are reserved, the RX UE may determine that the transmission of the PSSCH related to the SCI is the last transmission. Thereafter, for example, the RX UE may stop or not start timers related to the currently operating SL DRX (e.g., SL DRX on-duration timer, SL DRX inactivity timer, SL DRX HARQ RTT timer, or SL DRX retransmission timer) and operate in SL sleep mode. For example, the transmission resource information reserved by the TX UE included in the SCI may include reservation information for up to two or three transmission resources. For example, based on the fact that the transmission resource information reserved by the TX UE included in the SCI includes only reservation information for resources for the current PSSCH, the RX UE may determine that the transmission of the PSSCH related to the SCI is the last transmission. For example, based on the transmission being the transmission of the last PSSCH, the RX UE may not start the timer related to the SL DRX if the timer related to the SL DRX has not been started. Based on the transmission being the transmission of the last PSSCH, the RX UE may stop the timer related to the currently operating SL DRX and operate in SL sleep mode. In this case, the RX UE may determine that the last transmission is for one HARQ process or one SL process.

On the other hand, if an RX UE receives a PSCCH/PSSCH from a TX UE in its SL DRX on-duration, the RX UE may start an SL DRX Inactivity timer (e.g., a timer that extends the DRX on-duration or Active Time by the timer time), and the RX UE may extend the SL DRX on-duration.

According to one embodiment of the present disclosure, when the TX UE flushes the HARQ buffer for a sidelink transmit TB due to various causes below, it may transmit information indicating to flush the HARQ buffer (e.g., a HARQ Buffer Flush Indication) or information indicating to operate in SL sleep mode (e.g., a Go-To-Sleep Indication) to the RX UE. For example, a TX UE may inform an RX UE that no additional sidelink transmission TBs will be transmitted, by transmitting information indicating a HARQ buffer flush (e.g., a HARQ Buffer Flush Indication) or information indicating to operate in SL sleep mode (e.g., a Go-To-Sleep Indication) to an RX UE. For example, an RX UE may indicate that no further transmission (e.g., retransmission) of the sidelink transmit TB will be performed, by the TX UE by flushing the HARQ buffer based on the information indicating flushing the HARQ buffer (HARQ Buffer Flush Indication) or the information indicating operating in SL sleep mode (e.g., Go-To-Sleep Indication).

For example, when a TX UE transmits a TB using the Current SL grant, if the remaining PDB is not satisfied, the MAC entity may flush the HARQ buffer for that TB.

For example, if a TB transmitted by a TX UE is the last transmission, after the last transmission, the MAC entity may flush the HARQ buffer for that TB. For example, if the TB transmitted by the TX UE is the last transmission, after performing the last transmission and receiving the HARQ feedback for the last transmission, the MAC entity may flush the HARQ buffer for that TB. Here, for example, the last transmission may comprise a last retransmission.

For example, in resource allocation mode 1, the last transmission might be when the maximum number of allowed transmissions for a TB is reached.

For example, for a unicast transmission with HARQ feedback enabled in resource allocation mode 2, the last transmission may be when a TX UE receives a HARQ ACK for the PS CCH/P SSCH transmitted to an RX UE. For example, for a groupcast transmission operating in NACK only mode in resource allocation mode 2, the last transmission may be when the TX UE does not receive HARQ feedback from the RX UE for the PSCCH/PSSCH transmitted to the RX UE. In this case, for example, the TX UE may determine that this is an ACK. For example, the NACK only transmission mode may be such that no HARQ feedback is reported to the TX UE in case of an ACK, but a NACK is reported to the TX UE only in case of a NACK.

For example, if a MAC PDU to transmit has not been obtained using the established SL grant, the MAC entity may flush the HARQ buffer for that TB.

For example, if a Uu MAC Reset is performed, the MAC entity may only flush the HARQ buffer for SL TBs that are being transmitted or retransmitted using resources allocated in resource allocation mode 1. For example, if a Uu MAC Reset is performed, it may not be applied for resource allocation mode 2.

For example, if an SL Specific MAC Reset is performed, the AC entity may flush the HARQ buffer.

According to one embodiment of the present disclosure, when an RX UE receives a "HARQ buffer flush indication" from a TX UE, the RX UE may not operate the SL DRX Inactivity timer. The RX UE may then transition to SL DRX sleep mode when its SL DRX on-duration timer interval or Active Time interval expires. Here, for example, the HARQ buffer flush indication may be information indicating that the HARQ buffer has been flushed, and may be included in information related to a HARQ buffer flushing.

Alternatively, for example, if the TX UE has flushed its HARQ buffer, it may transmit information indicating to operate in SL sleep mode (e.g., a Go-To-Sleep Indication) to the RX UE via at least one of the SCI, MAC CE, or PC5 RRC messages. The RX UE may operate in SL DRX sleep mode without triggering the SL DRX Inactivity timer based on the information indicating to operate in SL sleep mode.

For example, the SCI may include a HARQ buffer flush indication or information indicating to operate in SL sleep mode. For example, an SCI including a HARQ buffer flush indication or information indicating to operate in SL sleep mode may include information related to an SL service. For example, to prevent a counterpart UE (e.g., a UE receiving a HARQ buffer flush indication or an SCI including information indicating to operate in SL sleep mode) to stop or not start a timer related to SL DRX (e.g., SL DRX on-duration timer, SL DRX inactivity timer, SL DRX HARQ RTT timer, or SL DRX retransmission timer), when a UE transmits a HARQ buffer flush indication or information to operate in SL sleep mode via SCI, the UE may also transmit information related to a "sidelink service" so that only the SL DRX timers related to that specific sidelink service are stopped. For example, the information related to the sidelink service may include at least one of the following: a PC5 5G QoS Indicator (PQI) related to the sidelink service, a PC5 QoS Flow Identifier (PFI) related to the sidelink service, or an SL Priority related to the sidelink service.

For example, a HARQ buffer flush indication or an SCI including information indicating to operate SL sleep mode may include information regarding a duration of operation in SL sleep mode. For example, to prevent a counterpart UE (e.g., the UE that receives the HARQ buffer flush indication or the SCI including information indicating to operate in SL sleep mode) to stop or not start the timer related to SL DRX (e.g., SL DRX on-duration timer, SL DRX inactivity timer, SL DRX HARQ RTT timer, or SL DRX retransmission timer), when a UE transmits a HARQ buffer flush indication or information indicating to operate in SL sleep mode via the SCI, the UE may also transmit information regarding the duration of sleep mode. In this case, for example, if the RX UE operates in SL sleep mode without stopping or starting the SL DRX timer, the RX UE may operate in the SL sleep mode state for the duration of the SL sleep mode operation.

For example, the HARQ buffer flush indication or information indicating to operate in SL sleep mode included in the SCI may be indicated per at least one of a PC5 unicast link, a PC5 RRC connection, or a source/destination pair. For example, the HARQ buffer flush indication or information indicating to operate in SL sleep mode included in the SCI may be determined based on at least one of a PC5 unicast link, a PC5 RRC connection, or a source/destination pair. For example, to stop or not start a timer related to SL DRX (e.g., SL DRX on-duration timer, SL DRX inactivity timer, SL DRX HARQ RTT timer, or SL DRX retransmission timer) related to a Specific PC5 Unicast Link, a UE may transmit at least one of "a specific PC5 unicast link identifier, an L1 source layer ID, an L1 destination layer ID to distinguish the unicast link, or cast type information" together with a HARQ buffer flush indication or information indicating to operate in SL sleep mode.

For example, the HARQ buffer flush indication or information indicating to operate in SL sleep mode included in the SCI may be destination specific. For example, the HARQ buffer flush indication or information indicating to operate in SL sleep mode included in SCI may be determined based on the destination, i.e., to ensure that only timers related to the SL DRX related to a specific destination are stopped or not started, the UE may transmit "L1 destination layer ID information" along with the HARQ buffer flush indication or information indicating to operate in SL sleep mode.

For example, the HARQ buffer flush indication or information indicating to operate in SL sleep mode included in SCI may be indicated per HARQ process ID or SL process. For example, the HARQ buffer flush indication or information indicating to operate in SL sleep mode included in SCI may be determined based on at least one of the HARQ process ID or SL process. That is, for example, to ensure that only the timer related to the SL DRX related to a specific HARQ process or a specific SL process is stopped and/or not started, the UE may transmit "HARQ process ID or SL process ID" information with the HARQ buffer flush indication or information indicating to operate in SL sleep mode.

For example, a HARQ buffer flush indication or information indicating to operate in SL sleep mode may be transmitted explicitly via SCI or implicitly via information included in the SCI. For example, the RX UE may check the transmission resource information reserved by the TX UE included in the received SCI. If only resources for the current PSSCH are reserved, the RX UE may determine that the transmission of the PSSCH related to the SCI is the last transmission and may determine that the HARQ buffer for the HARQ process or sidelink process has been flushed. Thereafter, for example, the RX UE may stop or not start timers related to the currently operating SL DRX (e.g., the SL DRX on-duration timer, the SL DRX inactivity timer, the SL DRX HARQ RTT timer, or the SL DRX retransmission timer) and may operate in SL sleep mode. For example, the transmission resource information reserved by a TX UE included in SCI may include reservation information for up to two or three transmission resources. For example, based on the transmission resource information reserved by a TX UE included in SCI only including reservation information for resources for the current PSSCH, the RX UE may determine that the transmission of the PSSCH related to the SCI is the last transmission, and may determine that the HARQ buffer for the HARQ process or sidelink process has been flushed. For example, based on flushing the HARQ buffer for the HARQ process or sidelink process, the RX UE may not start the timer related to the SL DRX if the timer related to the SL DRX has not been started. Based on flushing the HARQ buffer for the HARQ process or the sidelink process, the RX UE may stop the timer related to the currently operating SL DRX and operate in SL sleep mode. At this time, the RX UE may determine that the HARQ buffer for one HARQ process or one SL process has been flushed.

On the other hand, for example, if an RX UE receives a PSCCH/PSSCH from a TX UE, fails to decode the PSCCH/PSSCH, and transmits an SL HARQ NACK to the TX UE, the RX UE may start the SL DRX HARQ round trip time (RTT) timer and operate in SL DRX sleep mode. For example, the SL DRX HARQ RTT timer may be a timer that determines that a retransmission packet from a TX UE will not come before the timer expires, and causes it to operate in SL sleep mode until the timer expires. Also, for example, the RX UE may transition to Active Mode upon expiration of the SL DRX HARQ RTT timer, start the SL DRX Retransmission timer, and monitor retransmission TBs transmitted by the TX UE. For example, the SL DRX retransmission timer may be a timer that determines that a TX UE will transmit a retransmission TB and causes monitoring of the retransmission TB to be performed for a maximum amount of time, or for the duration of the timer, that the TX UE waits for the retransmission TB.

In this case, for example, when a TX UE flushes the HARQ buffer for the sidelink transmit TB due to various reasons, it may transmit to an RX UE information indicating to flush the HARQ buffer (HARQ Buffer Flush Indication) or information indicating to operate in SL sleep mode (e.g., Go-To-Sleep Indication). For example, a TX UE may transmit a HARQ Buffer Flush Indication or information indicating to operate in SL sleep mode (e.g., Go-To-Sleep Indication) to an RX UE to indicate that no additional sidelink transmission TBs will be transmitted. For example, the RX UE may know that no further transmission (e.g., retransmission) of the sidelink transmission TB will be performed by the TX UE by flushing the HARQ buffer, based on the HARQ Buffer Flush Indication or information indicating to operate in SL sleep mode (e.g., Go-To-Sleep Indication).

For example, when a TX UE transmits a TB using the Current SL grant, if the remaining PDB is not satisfied, the MAC entity may flush the HARQ buffer for that TB.

For example, if a TB transmitted by a TX UE is the last transmission, after the last transmission, the MAC entity may flush the HARQ buffer for that TB. For example, if the TB transmitted by the TX UE is the last transmission, after performing the last transmission and receiving the HARQ feedback for the last transmission, the MAC entity may flush the HARQ buffer for that TB. Here, for example, the last transmission may comprise a last retransmission.

For example, in resource allocation mode 1, the last transmission might be when the maximum number of allowed transmissions for a TB is reached.

For example, for a unicast transmission with HARQ feedback enabled in resource allocation mode 2, the last transmission may be when a TX UE receives a HARQ ACK for the PSCCH/PSSCH transmitted to an RX UE. For example, for a groupcast transmission operating in NACK only mode in resource allocation mode 2, the last transmission may be when a TX UE does not receive HARQ feedback from an RX UE for the PSCCH/PSSCH transmitted to the RX UE. In this case, for example, the TX UE may determine this case as ACK. For example, the NACK only transmission mode may be such that no HARQ feedback is reported to the TX UE in case of an ACK, but a NACK is reported to the TX UE only in case of a NACK.

For example, if a MAC PDU to transmit has not been obtained using the established SL grant, the MAC entity may flush the HARQ buffer for that TB.

For example, if a Uu MAC Reset is performed, the MAC entity may flush the HARQ buffer only for SL TBs that are being transmitted or retransmitted using resources allocated in resource allocation mode 1. For example, if a Uu MAC Reset is performed, it may not be applied for resource allocation mode 2.

For example, if an SL Specific MAC Reset is performed, the MAC entity may flush the HARQ buffer.

According to one embodiment of the present disclosure, if an RX UE receives a "HARQ buffer flush indication" from a TX UE, it may not start an SL DRX HARQ RTT timer and an SL DRX retransmission timer. For example, if an RX UE is operating as the Active Time during the off-duration period of the SL DRX cycle, it may perform an operation to receive a retransmission TB. In this case, if an RX UE receives a HARQ buffer flush indication from a TX UE, the RX UE may immediately operate in SL DRX sleep mode without starting an SL DRX HARQ RTT timer and an SL DRX retransmission timer. For example, an RX UE may operate in the Active Time during the off-duration period of the SL DRX cycle to receive a retransmission TB and to transmit SL HARQ feedback. In this case, when an RX UE receives a HARQ buffer flush indication from a TX UE, the RX UE may immediately operate in SL DRX sleep mode without starting an SL DRX HARQ RTT timer and an SL DRX retransmission timer. Here, for example, the off-duration period may be a period during which an RX UE may operate in SL sleep mode. For example, the active time may be the time to monitor the PSCCH/PSSCH transmitted by a TX UE.

Alternatively, for example, if a TX UE has flushed the HARQ buffer, the TX UE may transmit information indicating to operate in SL sleep mode (e.g., Go-To-Sleep Indication) to an RX UE through at least one of SCI, MAC CE, or PC5 RRC messages, instead of the HARQ buffer flush indication. In this case, the RX UE may operate in SL sleep mode without starting an SL DRX HARQ RTT timer and an SL DRX retransmission timer. Here, for example, the SL sleep mode may be a sleep mode for the SL DRX.

The above embodiments may be applied to SL unicast transmission, groupcast, or broadcast transmission between a pair of UEs that have established a PC5 unicast link.

For example, a HARQ buffer flush indication or information indicating to operate in SL sleep mode may be included in SCI. For example, the SCI including the HARQ buffer flush indication or information indicating to operate in SL sleep mode may include information related to an SL service. For example, to prevent a counterpart UE (e.g., the UE receiving the SCI including the last transmission indication) from stopping or starting a timer related to SL DRX (e.g., SL DRX on-duration timer, SL DRX inactivity timer, SL DRX HARQ RTT timer, or SL DRX retransmission timer), when a UE transmits a HARQ buffer flush indication or information indicating to operate in SL sleep mode via SCI, the UE may also transmit information related to a "sidelink service" so that only the SL DRX timers related to the specific sidelink service are stopped. For example, the information related to the sidelink service may include at least one of a PC5 5G QoS Indicator (PQI) related to the sidelink service, a PC5 QoS Flow Identifier (PFI) related to the sidelink service, or an SL Priority related to the sidelink service.

For example, an SCI including a HARQ buffer flush indication or information indicating to operate in SL sleep mode may include information regarding the duration of SL sleep mode. For example, to prevent a counterpart UE (e.g., the UE receiving the SCI including the last transmission indication) from stopping or starting a timer related to SL DRX (e.g., the SL DRX on-duration timer, the SL DRX inactivity timer, the SL DRX HARQ RTT timer, or the SL DRX retransmission timer), when a UE transmits a HARQ buffer flush indication or information indicating to operate in SL sleep mode via SCI, the UE may also transmit information regarding the duration of sleep mode. In this case, for example, if an RX UE operates in SL sleep mode without stopping or starting the SL DRX timer, the RX UE may operate in the SL sleep mode state for the duration of the SL sleep mode operation.

For example, the HARQ buffer flush indication or information indicating to operate in SL sleep mode included in the SCI may be indicated through at least one of a PC5 unicast link, a PC5 RRC connection, or a source/destination pair. For example, the HARQ buffer flush indication or information indicating to operate in SL sleep mode included in the SCI may be determined based on at least one of a PC5 unicast link, a PC5 RRC connection, or a source/destination pair. For example, to stop or not start a timer related to SL DRX (e.g., SL DRX on-duration timer, SL DRX inactivity timer, SL DRX HARQ RTT timer, or SL DRX retransmission timer) related to a Specific PC5 Unicast Link, a UE may transmit at least one of "a specific PC5 unicast link identifier, an L1 source layer ID, an L1 destination layer ID to distinguish the unicast link, or cast type information" together with a HARQ buffer flush indication or information indicating to operate in SL sleep mode.

For example, the HARQ buffer flush indication or information indicating to operate in SL sleep mode included in SCI may be indicated per destination. For example, the HARQ buffer flush indication or information indicating to operate in SL sleep mode included in SCI may be determined based on the destination, i.e., for example, to ensure that only timers related to the SL DRX related to a specific destination are stopped or not started, a UE may transmit "L1 destination layer ID information" along with the HARQ buffer flush indication or information indicating to operate in SL sleep mode.

For example, the HARQ buffer flush indication or information indicating to operate in SL sleep mode included in the SCI may be indicated by per HARQ process ID or the SL process. For example, the HARQ buffer flush indication or information indicating to operate in SL sleep mode included in SCI may be determined based on at least one of the HARQ process ID or SL process. That is, for example, to ensure that only the timer related to the SL DRX related to a specific HARQ process or a specific SL process is stopped and/or not started, the UE may transmit "HARQ process ID or SL process ID" information with the HARQ buffer flush indication or information indicating to operate in SL sleep mode.

For example, a HARQ buffer flush indication or information indicating to operate in SL sleep mode may be transmitted explicitly via SCI or implicitly via information included in SCI. For example, an RX UE may check the transmission resource information reserved by a TX UE included in received SCI. If only resources for the current PSSCH are reserved, the RX UE may determine that the transmission of the PSSCH related to the SCI is the last transmission and may determine that the HARQ buffer for the HARQ process or sidelink process has been flushed. Thereafter, for example, the RX UE may stop or not start timers related to the currently operating SL DRX (e.g., the SL DRX on-duration timer, the SL DRX inactivity timer, the SL DRX HARQ RTT timer, or the SL DRX retransmission timer) and may operate in SL sleep mode. For example, the transmission resource information reserved by the TX UE included in SCI may include reservation information for up to two or three transmission resources. For example, based on the transmission resource information reserved by the TX UE included in SCI only including reservation information for resources for the current PSSCH, the RX UE may determine that the transmission of the PSSCH related to the SCI is the last transmission, and may determine that the HARQ buffer for the HARQ process or sidelink process has been flushed. For example, based on the flushing of the HARQ buffer for the HARQ process or the sidelink process, an RX UE may not start the timer related to the SL DRX if the timer related to the SL DRX has not been started. Based on the flushing of the HARQ buffer for the HARQ process or the sidelink process, the RX UE may stop the timer related to the currently operating SL DRX and operate in SL sleep mode. At this time, the RX UE may determine that the HARQ buffer for one HARQ process or one SL process has been flushed.

According to one embodiment of the present disclosure, when the HARQ feedback mode for SL communications is set to "Disabled", and when the MAC entity of a TX UE determines that the next retransmission of the MAC PDU is no longer required, it may transmit a positive acknowledgment to the physical layer, and may indicate to transmit a PUCCH (e.g., SL HARQ ACK) to a base station. In doing so, the base station may no longer allocate retransmission resources to the TX UE.

Also, for example, when the MAC entity of a TX UE determined that the next retransmission of the MAC PDU is no longer required and transferred a PUCCH (e.g., SL HARQ ACK) to the base station indicating a positive acknowledgment, the TX UE may transmit specific information to an RX UE to prevent the RX UE from starting timers related to SL DRX (e.g., SL DRX Inactivity timer, SL DRX HARQ RTT timer, SL DRX Retransmission timer). For example, if the MAC entity of the TX UE determined that the next retransmission of the MAC PDU is no longer required and is about to deliver a PUCCH (e.g., SL HARQ ACK) to the base station indicating a positive acknowledgment, the TX UE may transmit specific information to the RX UE to cause the RX UE to not start the timers related to SL DRX. Here, for example, the specific information may be a specific indication. For example, the specific information may include at least one of information indicating to operate in SL sleep mode or information indicating to not start the timer related to the SL DRX. Here, for example, the timer related to the SL DRX may include at least one of an SL DRX Inactivity timer, an SL DRX HARQ RTT timer, and an SL DRX retransmission timer. For example, at least one of the information indicating to operate in SL sleep mode or not to start a timer related to SL DRX may be transmitted from a TX UE to an RX UE via an SCI, MAC CE, or PC5 RRC message. Here, the RX UE may be a counterpart peer UE. For example, when an RX UE receives at least one of the information indicating to operate in SL sleep mode or information indicating not to start the timer related to the SL DRX from a TX UE, the RX UE may operate in SL sleep mode without starting an timer related to the SL DRX. For example, if the interval at which the RX UE receives at least one of the information indicating to operate in SL sleep mode or the information indicating not to start the timer related to SL DRX is an SL DRX on-duration interval, the RX UE may operate in SL DRX sleep mode when the on-duration timer expires. For example, if an RX UE receives at least one of the information indicating to operate in SL sleep mode or information indicating not to start a timer related to SL DRX from a TX UE while the SL DRX inactivity timer or SL DRX retransmission timer is running, the RX UE may stop the SL DRX inactivity timer or SL DRX retransmission timer and operate in SL sleep mode.

For example, information indicating to operate in SL sleep mode or information indicating to not start timers related to SL DRX may be included in SCI. For example, the SCI including information indicating to operate in SL sleep mode or information indicating not to start a timer related to SL DRX may include information related to an SL service. For example, to cause a counterpart UE (e.g., a UE receiving information indicating to operate in SL sleep mode or information indicating not to start a timer related to SL DRX) to stop or not start a timer related to SL DRX (e.g., SL DRX on-duration timer, SL DRX inactivity timer, SL DRX HARQ RTT timer, or SL DRX retransmission timer), when a UE transmits information indicating to operate in SL sleep mode or not to start timers related to SL DRX via SCI, the UE may also transmit information related to a "sidelink service" so that only the SL DRX timers related to the specific sidelink service are stopped. For example, the information related to the sidelink service may include at least one of the following: a PC5 5G QoS Indicator (PQI) related to the sidelink service, a PC5 QoS Flow Identifier (PFI) related to the sidelink service, or an SL Priority related to the sidelink service.

For example, an SCI including information indicating to operate in SL sleep mode or information indicating to not start a timer related to SL DRX may include information regarding the duration of sleep mode. For example, to cause a counterpart UE (e.g., the UE receiving SCI including information indicating to operate in SL sleep mode or information indicating to not start timers related to SL DRX) to stop or not start timers related to SL DRX (e.g., SL DRX on-duration timer, SL DRX inactivity timer, SL DRX HARQ RTT timer, or SL DRX retransmission timer), when a UE transmits information indicating to operate in SL sleep mode or not to start the timers related to SL DRX via SCI, the UE may also transmit information regarding the duration of sleep mode. In this case, for example, if an RX UE operates in SL sleep mode without stopping or starting an SL DRX timer, the RX UE may operate in the SL sleep mode state for the duration of the SL sleep mode operation.

For example, information indicating to operate in SL sleep mode or not to start a timer related to the SL DRX included in SCI may be indicated per at least one of PC5 unicast link, PC5 RRC connection, or source/destination pair. For example, information indicating to operate in SL sleep mode or not to start a timer related to SL DRX included in SCI may be determined based on at least one of a PC5 unicast link, a PC5 RRC connection, or a source/destination pair. For example, in order to stop or not start a timer related to the SL DRX (e.g., the SL DRX on-duration timer, the SL DRX inactivity timer, the SL DRX HARQ RTT timer, or the SL DRX retransmission timer) related to a Specific PC5 Unicast Link, the UE may transmit at least one of "a specific PC5 unicast link identifier, an L1 source layer ID, an L1 destination layer ID capable of distinguishing the unicast link, or cast type information" together with information indicating to operate in SL sleep mode or not to start timers related to SL DRX.

For example, information indicating to operate in SL sleep mode or not to start a timer related to the SL DRX included in SCI may be indicated per destination. For example, the information indicating to operate in SL sleep mode or not to start the timer related to the SL DRX included in SCI may be determined based on a destination, i.e., for example, to ensure that only the timer related to the SL DRX related to a specific destination is stopped or not started, a UE may transmit "L1 destination layer ID information" with the information indicating to operate in SL sleep mode or not to start the timer related to the SL DRX.

For example, information indicating to operate in SL sleep mode or not to start a timer related to SL DRX included in SCI may be indicated per HARQ process ID or SL process. For example, the information indicating to operate in SL sleep mode or not to start the timer related to SL DRX included in SCI may be determined based on at least one of a HARQ process ID or SL process. That is, for example, to stop or not start only the timer related to SL DRX related to a specific HARQ process or a specific SL process, a UE may transmit "HARQ process ID or SL process ID" information with the information indicating to operate in SL sleep mode or not to start the timer related to SL DRX.

For example, information indicating to operate in SL sleep mode or not to start timers related to SL DRX may be transmitted explicitly in SCI, or implicitly through information included in the SCI. For example, an RX UE may check the transmission resource information reserved by a TX UE included in the received SCI. In this case, if only resources for the current PSSCH are reserved, the RX UE may determine that the transmission of the PSSCH related to the SCI is the last transmission and may determine that the HARQ buffer for the HARQ process or sidelink process has been flushed. Thereafter, for example, the RX UE may stop or not start timers related to the currently operating SL DRX (e.g., the SL DRX on-duration timer, the SL DRX inactivity timer, the SL DRX HARQ RTT timer, or the SL DRX retransmission timer) and may operate in SL sleep mode. For example, the transmission resource information reserved by the TX UE included in the SCI may include reservation information for up to two or three transmission resources. For example, based on the transmission resource information reserved by the TX UE included in the SCI only including reservation information for resources for the current PSSCH, the RX UE may determine that the transmission of the PSSCH related to the SCI is the last transmission, and may determine that the HARQ buffer for the HARQ process or sidelink process has been flushed. For example, based on flushing the HARQ buffer for the HARQ process or sidelink process, the RX UE may not start the timer related to the SL DRX if the timer related to the SL DRX has not been started. Based on flushing the HARQ buffer for the HARQ process or the sidelink process, the RX UE may stop the timer related to the currently operating SL DRX and operate in SL sleep mode. At this point, the RX UE may determine that the HARQ buffer for one HARQ process or one SL process has been flushed.

On the other hand, for NR Uu operation, an on-duration timer, an inactivity timer may be configured or counted as an absolute time value (e.g., ms), an RTT timer may be configured or counted as a symbol count, and a retransmission timer may be configured or counted as a slot count. Here, a symbol may be a physical symbol. Further, a long DRX cycle, a DRX start offset, a short DRX cycle, and a DRX slot offset may be configured or counted as absolute time values (e.g., ms).

On the other hand, in the case of SL DRX, it can be discussed whether to apply the parameter/counting method of Uu described above or to use other methods to increase the effectiveness of power saving.

According to one embodiment of the present disclosure, an SL DRX retransmission timer may be configured or counted by the number of SL slots in a resource pool. For example, an SL HARQ RTT timer may be configured or counted by the number of SL symbols actually used for SL purposes belonging to a resource pool. For example, an SL HARQ RTT timer may be configured or counted by the number of physical symbols used for SL purposes belonging to a resource pool. For example, at least one of the remaining timers related to the SL DRX, the offset related to the SL DRX, or the cycle related to the SL DRX may be configured or counted by reusing the Uu method.

Alternatively, for example, an SL DRX retransmission timer may be configured or counted by the number of physical slots, regardless of whether they are included in a resource pool. For example, an SL DRX RTT timer may be configured or counted by the number of physical symbols, regardless of whether they are included in a resource pool. For example, at least one of remaining timers related to SL DRX, an offset related to SL DRX, or a cycle related to SL DRX may be configured or counted by reusing the Uu method.

According to one embodiment of the present disclosure, at least one of a timer related to SL DRX, an offset related to SL DRX, or a cycle related to SL DRX, in which an absolute time value (e.g., ms) is configured, may be counted based on an SL slot belonging to a resource pool. Here, for example, one SL slot length may be assumed to be K ms, and N SL slots may mean "N*K ms". Alternatively, for example, the counting may be based on resources used for actual SL communication on SL slots belonging to a resource pool. Here, for example, if it is assumed that one SL slot is K ms long and the set of SL symbols used for actual SL communication on an SL slot is Q ms (i.e., Q≤K), N SL slots may mean "N*Q ms".

Alternatively, for example, at least one of a timer related to SL DRX, an offset related to SL DRX, or a cycle related to SL DRX, where an absolute time value (e.g., ms) is configured, may be counted based on SL symbols actually used for SL purposes belonging to a resource pool. For example, assuming a single symbol length of W ms, N SL symbols may mean "N*W ms". For example, in at least one of the following cases: a timer related to an SL DRX where an absolute time value (e.g., ms) is configured, an offset related to an SL DRX, or a cycle related to an SL DRX, it may be counted based on physical symbols, regardless of whether the resources in a resource pool are used for SL purposes. For example, assuming that a symbol length is W ms long, N SL physical symbols may mean "N*W ms".

Alternatively, for example, at least one of a timer related to SL DRX, an offset related to SL DRX, or a cycle related to SL DRX, where an absolute time value (e.g., ms) is configured, may be counted based on a physical slot, whether or not it is included in a resource pool. Here, for example, assuming that one physical slot is X ms long, N physical slots may mean "N*X ms". Alternatively, for example, for at least one of a timer related to SL DRX, an offset related to SL DRX, or a cycle related to SL DRX where an absolute time value (e.g., ms) is configured, the counting may be based on a physical symbol. Here, for example, assuming a length of one physical symbol to be Y ms, N physical symbols may mean "N*Y ms".

According to one embodiment of the present disclosure, for SL DRX, at least one of all timers, offsets, and cycles may be configured or counted as the number of SL slots in a resource pool. Alternatively, for example, at least one of all timers, offsets, and cycles may be configured or counted as the number of SL symbols actually used for SL purposes belonging to a resource pool. Or, for example, at least one of all timers, offsets, and cycles may be configured or counted as a physical symbol count, regardless of whether resources in a resource pool are used for SL purposes. Or, for example, at least one of all timers, offsets, and cycles may be configured or counted by the number of physical slots, regardless of whether they are included in a resource pool. Or, for example, at least one of all timers, offsets, and cycles may be configured or counted as a physical symbol count, regardless of whether they are included in a resource pool.

According to one embodiment of the present disclosure, for SL DRX, at least one of the pre-configured timer, offset, and cycle may be configured or counted as the number of SL slots in a resource pool. Alternatively, for example, at least one of the pre-configured timer, offset, and cycle may be configured or counted as the number of SL symbols actually used for SL purposes belonging to a resource pool. Alternatively, for example, at least one of the pre-configured timer, offset, and cycle may be configured or counted as a physical symbol count regardless of whether resources in a resource pool are used for SL purposes. Alternatively, for example, at least one of the pre-configured timer, offset, and cycle may be configured or counted as the number of physical slots regardless of whether resources are included in a resource pool. Alternatively, for example, at least one of the pre-configured timer, offset, and cycle may be configured or counted as a physical symbol count, regardless of whether resources are included in a resource pool.

Here, for example, the various embodiments described above can be applied to at least one of an on-duration timer, an inactivity timer, a retransmission timer, a long DRX cycle, a DRX start offset, a short DRX cycle, a DRX slot offset, or a HARQ RTT timer.

For example, at least one of whether short DRX cycles are applied, whether long DRX cycles are applied, and whether DRX timers are applied or whether to operate may be configured differently, according to at least one of a cast type, a service type, a priority, or a QoS requirement.

For example, for at least one of the groupcast or broadcast, unlike unicast, a long DRX cycle may be applied, and at least one of a short DRX cycle or a DRX timer may not be applied. For example, for at least one of the groupcast or broadcast, unlike a unicast, a long DRX cycle or DRX timer may also not be applied.

In this disclosure, "physical slot or physical symbol" may include "resource to which a resource pool bitmap is applied". For example, a resource to which a resource pool bitmap is applied may include a UL resource that includes a pre-configured SL start/end symbol region, excluding DL resources, SL SSB resources, reserved slots, etc. Alternatively, for example, a "physical slot or physical symbol" may include "any UL resource". For example, "physical slot or physical symbol" may include "all UL/DL resources". And, it may be interpreted as above. Also, in this disclosure, a "sidelink slot or sidelink symbol" may include a "resource belonging to a resource pool". For example, a resource belonging to a resource pool may include an SL resource used for actual SL communication on an SL slot.

Also, for example, in this disclosure, "Configuration" or "designation" may take the form of a base station informing a UE over a predefined physical layer channel/signal or higher layer channel/signal (e.g., SIB, RRC, MAC CE). For example, a "configuration" or "designation" may include a form in which something is being provided by a pre-configuration, or a form in which a UE informs another UE something via a predefined physical layer channel/signal or higher layer channel/signal (e.g., SL MAC CE, PC5 RRC). Further, the various embodiments of the present disclosure may be combined with each other.

In various embodiments of the present disclosure, the SL DRX timers mentioned below may be used for the following purposes.

For example, an SL DRX on-duration timer may be used in intervals where a UE performing SL DRX operation needs to operate with a default active time to receive PSCCH/PSSCH from another UE.

For example, an SL DRX inactivity timer may be used in an interval to extend an SL DRX on-duration interval, which is an interval during which a UE performing SL DRX operation must operate as active time by default to receive PSCCH/PSSCH from another UE, i.e., for example, it may extend the SL DRX on-duration timer by the SL DRX inactivity timer interval. In addition, when a UE receives a new packet (e.g., a new PSSCH) from another UE, it may start an SL DRX inactivity timer to extend an SL DRX on-duration timer. For example, an SL DRX HARQ RTT timer may be used in intervals where a UE performing SL DRX operation is operating in sleep mode until it receives a retransmission packet (or PSSCH assignment) from another UE. That is, for example, when a UE may start an SL DRX HARQ RTT timer, it may determine that the counterpart UE will not transmit a sidelink retransmission packet to it until the SL DRX HARQ RTT timer expires, and the UE may operate in sleep mode during that timer.

For example, an SL DRX retransmission timer may be used during an interval when a UE performing SL DRX operation is operating as active time to receive retransmission packets (or PSSCH assignments) transmitted by the counterpart UE. For example, during the SL DRX retransmission timer interval, the UE may monitor the reception of retransmission sidelink packets (or PSSCH assignments) transmitted by the counterpart UE.

Various embodiments of the present disclosure may be applied to a UE-Pair Specific SL DRX configuration, a UE-Pair Specific SL DRX pattern, parameters included in a UE-Pair Specific SL DRX configuration, and timers included in a UE-Pair Specific SL DRX configuration, not just for a Default/Common SL DRX configuration, a Default/Common SL DRX pattern, parameters included in a Default/Common SL DRX configuration, or timers included in a Default/Common SL DRX configuration.

Also, in the present disclosure, for example, an "On-duration" may be an interval of Active Time. For example, an active time may be an interval during which an RF module is operating in a wake up state (i.e., "on") to receive/transmit radio signals. For example, an "Off-duration" may be a Sleep Time interval. For example, a Sleep Time interval may be an interval during which an RF module operates in a sleep mode state (the RF module is "off") to save power. For example, a sleep time interval may not imply that a transmitting UE is obligated to operate in sleep mode during the sleep time interval. For example, a UE may be permitted to operate as active time for a short period of time for sensing operations/transmission operations, if required, even during sleep time.

Further, for example, whether the various embodiments of the present disclosure are applied may be configured differently or independently according to a resource pool, congestion level, service priority, service type, QoS requirement (e.g., latency, reliability), PQI, traffic type (e.g., periodic generation, aperiodic generation), or SL transmission resource allocation mode (mode 1, mode 2). For example, parameters (e.g., thresholds) related to various embodiments of the present disclosure may be configured differently or independently according to a resource pool, a congestion level, a service priority, a service type, a QoS requirement (e.g., latency, reliability), a PQI, a traffic type (e.g., periodic generation, aperiodic generation), or an SL transmission resource allocation mode (e.g., mode 1, mode 2).

For example, whether the various embodiments of the present disclosure are applied may be configured independently or differently for at least one of a resource pool (e.g., PSFCH-enabled resource pool, non-PSFCH-enabled resource pool), service/packet type, priority, QoS requirements (e.g., URLLC/EMBB traffic, reliability, latency), PQI, PFI, cast type (e.g., unicast, groupcast, broadcast), congestion level (e.g., CBR), resource pool congestion level, SL HARQ feedback method (e.g., feedback NACK only, feedback ACK/NACK), MAC PDU transmission with HARQ feedback enabled, MAC PDU transmission with HARQ feedback disabled, whether to enable PUCCH-based SL HARQ feedback reporting operation, whether to perform pre-emption, and whether to perform re-evaluation, pre-emption-based resource reselection, re-evaluation-based resource reselection, L1 source identifier, L1 destination identifier, L2 source identifier, L2 destination identifier, combination identifier of L1 source layer ID and L1 destination layer ID, combination identifier of L2 source layer ID and L2 destination layer ID, combination identifier of pair of L1 source layer ID and L1 destination layer ID and cast type, combination identifier of pair of L2 source layer ID and L2 destination layer ID and cast type, PC5 RRC connection/link, whether SL DRX is performed, whether SL DRX is supported, SL mode type (resource allocation mode 1, resource allocation mode 2), reservation operation of periodic resources or reservation operation of aperiodic resources.

For example, parameter configuration values related to various embodiments of the present disclosure may be configured independently or differently for at least one of a resource pool (e.g., PSFCH-enabled resource pool, non-PSFCH-enabled resource pool), service/packet type, priority, QoS requirements (e.g., URLLC/EMBB traffic, reliability, latency), PQI, PFI, cast type (e.g., unicast, groupcast, broadcast), congestion level (e.g., CBR), resource pool congestion level, SL HARQ feedback method (e.g., feedback NACK only, feedback ACK/NACK), MAC PDU transmission with HARQ feedback enabled, MAC PDU transmission with HARQ feedback disabled, whether to enable PUCCH-based SL HARQ feedback reporting operation, whether to perform pre-emption, and whether to perform re-evaluation, pre-emption-based resource reselection, re-evaluation-based resource reselection, L1 source identifier, L1 destination identifier, L2 source identifier, L2 destination identifier, combination identifier of L1 source layer ID and L1 destination layer ID, combination identifier of L2 source layer ID and L2 destination layer ID, combination identifier of pair of L1 source layer ID and L1 destination layer ID and cast type, combination identifier of pair of L2 source layer ID and L2 destination layer ID and cast type, PC5 RRC connection/link, whether SL DRX is performed, whether SL DRX is supported, SL mode type (resource allocation mode 1, resource allocation mode 2), reservation operation of periodic resources or reservation operation of aperiodic resources.

In the present disclosure, for example, a "certain time" may be a period of time during which a UE operates as an Active Time for a predefined amount of time to receive sidelink signaling or sidelink data from another UE. For example, a "certain time" may be a period of time during which a UE operates as active time for a timer (SL DRX retransmission timer, SL DRX inactivity timer, timer that ensures that an RX UE operates as active time in DRX operation) time to receive sidelink signaling or sidelink data from another UE.

Various embodiments of the present disclosure may be applied to millimeter wave (mmWave) SL operation. Whether the various embodiments of the present disclosure are applied may be applied to millimeter wave (mmWave) SL operation. The parameter configuration values related to the various embodiments of the present disclosure may be applied to millimeter wave (mmWave) SL operation.

Figure 8:
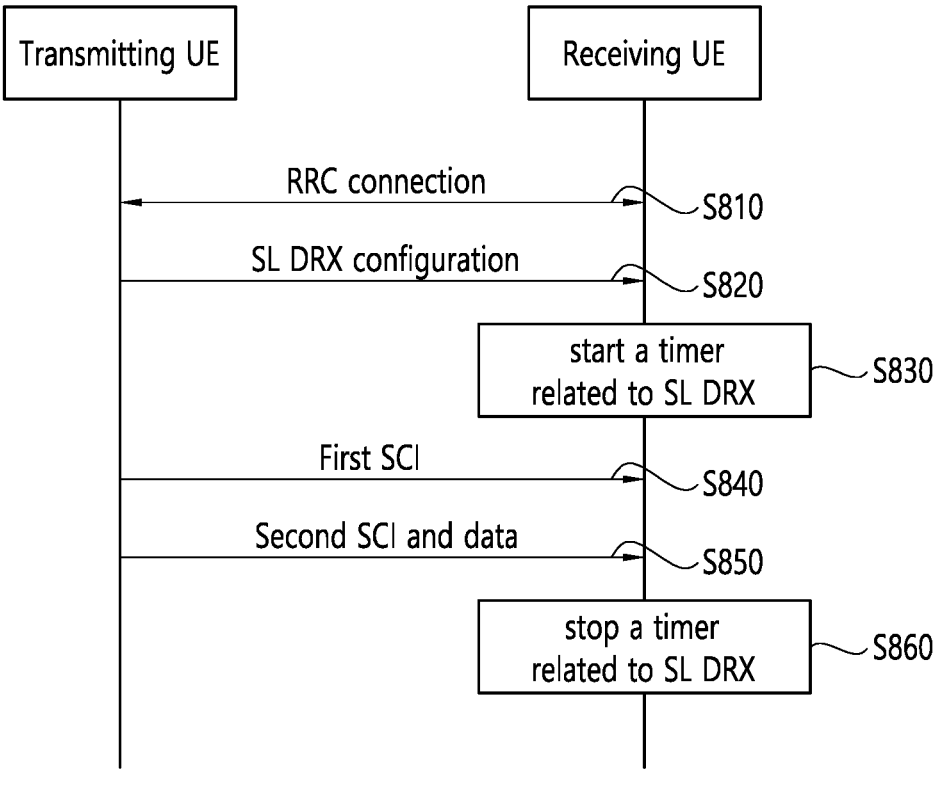
FIG. 8 shows a procedure for a receiving UE to stop a timer related to an SL DRX, according to one embodiment of the present disclosure.

FIG. 8 shows a procedure for a receiving UE to stop a timer related to an SL DRX, according to one embodiment of the present disclosure. The embodiment of FIG. 8 may be combined with various embodiments of the present disclosure.

Referring to FIG. 8, at step S810, a transmitting UE and a receiving UE may establish a radio resource control (RRC) connection.

In step S820, the receiving UE may receive an SL DRX configuration from the transmitting UE. For example, the SL DRX configuration may include information related to a sidelink discontinuous reception (SL DRX) cycle, and information related to a timer for an active time.

In step S830, the receiving UE may start a timer related to SL DRX. Here, for example, the timer related to the SL DRX may be determined based on information related to the timer for the active time. For example, the timer related to the SL DRX may include a timer for an active time.

In step S840, the receiving UE may receive a first sidelink control information (SCI) from the transmitting UE. For example, the receiving UE may receive from the transmitting UE first SCI for scheduling a physical sidelink shared channel (PSSCH) over a physical sidelink control channel (PSCCH) based on a first resource.

In step S850, the receiving UE may receive second SCI and data from the transmitting UE. For example, the receiving UE may receive the second SCI and data from the transmitting UE via the PSSCH based on the first resource.

In step S860, the receiving UE may stop a timer related to SL DRX. For example, the first SCI may include resource allocation information. For example, based on the resource allocation information, which includes only information regarding the first resource, the timer may be stopped.

For example, the first resource may include one slot and at least one sub-channel.

For example, based on the resource allocation information, which includes only information regarding the first resource, it may be determined that the transmission for the PSSCH is the last transmission.

For example, based on the resource allocation information, which includes only information for the first resource, it may be determined that a buffer for a hybrid automatic repeat request (HARQ) process related to the PSSCH has been flushed.

For example, based on the resource allocation information, which includes information regarding the first resource only, it may be determined that it is indicated that the timer is not to be started. For example, step S830 may be omitted, and in this case, the timer related to the SL DRX may not be started.

For example, a receiving UE may receive information from a transmitting UE about the time for operating in sleep mode. For example, the information regarding the time for operating in the sleep mode may be received via any one of SCI, RRC signaling, or medium access control (MAC) control element (CE). For example, based on the information regarding the time for operating in the sleep mode, a period during which the timer is stopped may be determined.

For example, the timer may include at least one of an SL DRX on-duration timer, an SL DRX inactivity timer, an SL DRX hybrid automatic repeat request (HARQ) round trip time (RTT) timer, or an SL DRX retransmission timer.

For example, a receiving UE may receive information regarding a sidelink service from a transmitting UE. For example, the information regarding the sidelink service may include at least one of a PC5 5G quality of service identifier (PQI) for the sidelink service, a PC5 quality of service flow identifier (PFI) for the sidelink service, and a priority for the sidelink service. For example, the timer may be determined based on information regarding the sidelink service.

Figure 9:
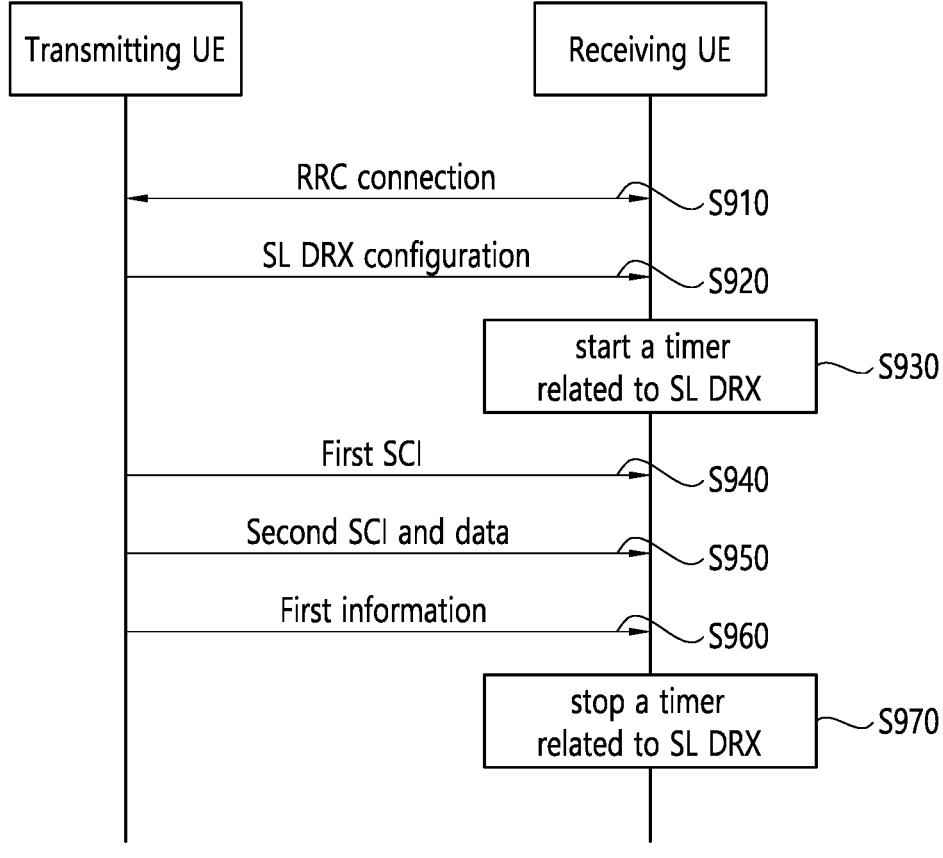
FIG. 9 shows another procedure for a receiving UE to stop a timer related to SL DRX, according to one embodiment of the present disclosure.

FIG. 9 shows another procedure for a receiving UE to stop a timer related to SL DRX, according to one embodiment of the present disclosure. The embodiment of FIG. 9 may be combined with various embodiments of the present disclosure.

Referring to FIG. 9, in step S910, a transmitting UE and a receiving UE may establish a radio resource control (RRC) connection.

In step S920, the receiving UE may receive an SL DRX configuration from the transmitting UE. For example, the SL DRX configuration may include information related to a sidelink discontinuous reception (SL DRX) cycle, and information related to a timer for an active time.

In step S930, the receiving UE may start a timer related to SL DRX. Here, for example, the timer related to the SL DRX may be determined based on information related to the timer for an active time. For example, the timer related to the SL DRX may include a timer for an active time.

In step S940, the receiving UE may receive first sidelink control information (SCI) from the transmitting UE. For example, the receiving UE may receive from the transmitting UE first SCI for scheduling a physical sidelink shared channel (PSSCH) over a physical sidelink control channel (PSCCH) based on a first resource.

In step S950, the receiving UE may receive second SCI and data from the transmitting UE. For example, the receiving UE may receive second SCI and data from the transmitting UE via the PSSCH based on the first resource.

In step S960, the receiving UE may receive first information from the transmitting UE. For example, the first information may be a PDB value related to the data. For example, the first information may be information related to the data being the last transmission. For example, the first information may be information related to the HARQ buffer being flushed. For example, the first information may be information related to operating in SL sleep mode. For example, the first information may be information related to not starting a timer related to SL DRX. For example, the first information may be included in the first SCI or the second SCI. For example, the first information may be transmitted via RRC signaling or a medium access control (MAC) control element (CE).

In step S970, the receiving UE may stop a timer related to SL DRX. For example, the first SCI may include resource allocation information. For example, based on the resource allocation information, which may include only information regarding the first resource, the timer may be stopped.

For example, the receiving UE may stop a timer related to SL DRX based on the first information.

For example, the receiving UE may stop a timer related to SL DRX based on the PDB value related to the data. If the data is received after the HARQ NACK for the data has been transmitted, and the PDB value related to the data is not satisfied, the receiving UE may stop the timer related to SL DRX.

For example, the receiving UE may stop the timer related to SL DRX based on information related to the data being the last transmission. For example, the receiving UE may stop the timer related to SL DRX based on at least one of the resource allocation information, which includes only information regarding the first resource, or information related to the data being the last transmission.

For example, the receiving UE may stop the timer related to SL DRX based on information related to the HARQ buffer being flushed. For example, the receiving UE may stop the timer related to SL DRX based on at least one of the resource allocation information, which includes only information regarding the first resource, or information related to the HARQ buffer being flushed. Here, for example, the HARQ buffer may be a buffer related to the data.

For example, the receiving UE may stop the timer related to SL DRX based on information related to operating in the SL sleep mode. For example, the receiving UE may stop the timer related to the SL DRX based on at least one of the resource allocation information, which includes only information regarding the first resource, or information related to operating in SL sleep mode.

For example, the receiving UE may stop the timer related to SL DRX based on information related to not starting the timer related to SL DRX. For example, the receiving UE may stop the timer related to SL DRX based on at least one of the resource allocation information, which includes only information regarding the first resource, or information related to not starting the timer related to SL DRX.

For example, the first resource may include one slot and at least one sub-channel.

For example, based on the resource allocation information, which includes only information regarding the first resource, it may be determined that the transmission for the PSSCH is the last transmission.

For example, based on the resource allocation information, which includes only information for the first resource, it may be determined that a buffer for a hybrid automatic repeat request (HARQ) process related to the PSSCH has been flushed.

For example, based on the resource allocation information, which includes information regarding the first resource only, it may be determined that it is indicated that the timer is not to be started. For example, step S930 may be omitted, and in this case, the timer related to the SL DRX may not be started.

For example, a receiving UE may receive information from a transmitting UE about the time for operating in sleep mode. For example, the information regarding the time for operating in the sleep mode may be received via any one of SCI, RRC signaling, or medium access control (MAC) control element (CE). For example, based on the information regarding the time for operating in the sleep mode, a period during which the timer is stopped may be determined.

For example, the timer may include at least one of an SL DRX on-duration timer, an SL DRX inactivity timer, an SL DRX hybrid automatic repeat request (HARQ) round trip time (RTT) timer, or an SL DRX retransmission timer.

For example, a receiving UE may receive information regarding a sidelink service from a transmitting UE. For example, the information regarding the sidelink service may include at least one of a PC5 5G quality of service identifier (PQI) for the sidelink service, a PC5 quality of service flow identifier (PFI) for the sidelink service, and a priority for the sidelink service. For example, the timer may be determined based on information regarding the sidelink service.

For example, the receiving UE may receive information from the transmitting UE indicating that the transmission to the PSSCH is the last transmission. For example, the information indicating that the transmission for the PSSCH is the last transmission may be determined based on at least one of a PC5 unicast link, a destination, a HARQ process ID, or a sidelink process.

Figure 10:
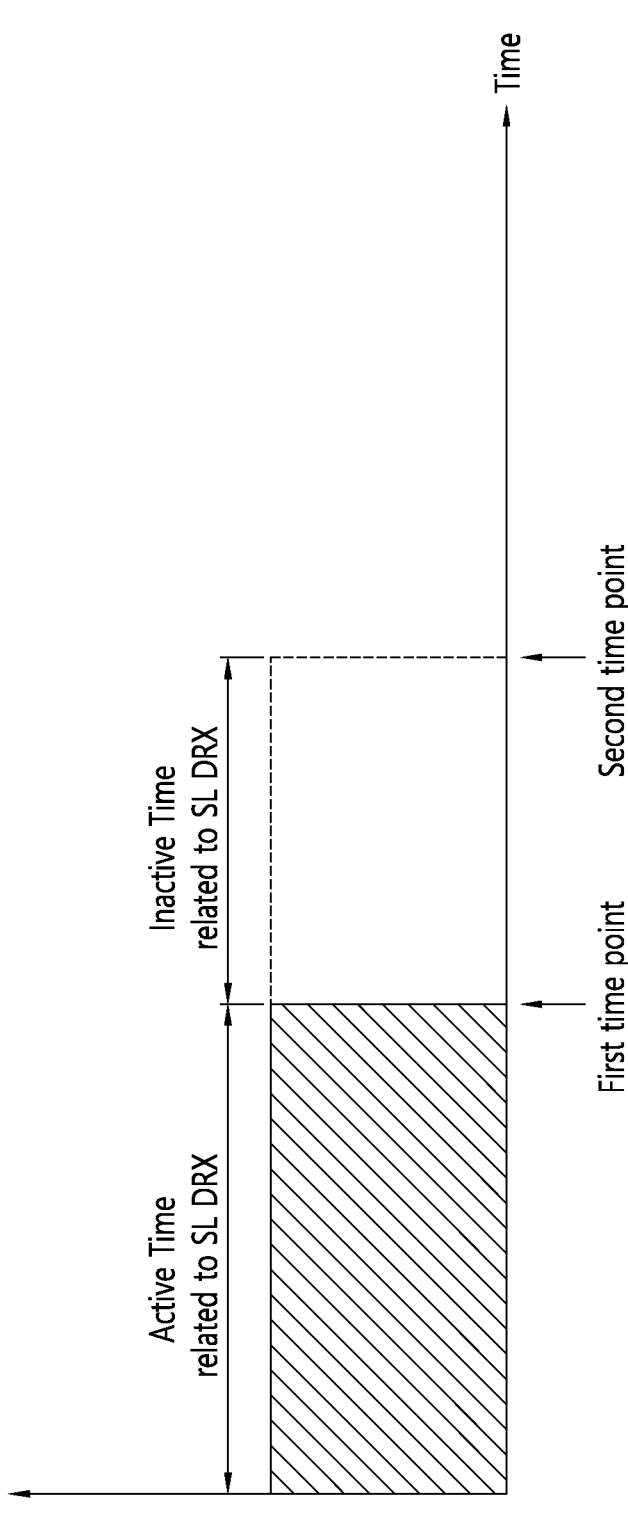
FIG. 10 is an example of a receiving UE starting and stopping a timer related to SL DRX, according to one embodiment of the present disclosure.

FIG. 10 is an example of a receiving UE starting and stopping a timer related to SL DRX, according to one embodiment of the present disclosure. The embodiment of FIG. 10 may be combined with various embodiments of the present disclosure.

Referring to FIG. 10, for example, a receiving UE may receive, based on a first resource, first SCI via PSCCH from a transmitting UE in an active time related to SL DRX. Then, the receiving UE may receive second SCI and data based on the first resource via PSSCH from the transmitting UE in the active time related to SL DRX. Here, for example, if the first SCI includes resource allocation information and if the resource allocation information only includes information regarding the first resource, the receiving UE may determine that the transmission on the PSSCH is the last transmission. Accordingly, the receiving UE may determine at a first time point that the first SCI includes only information regarding the first resource, and may stop the timer related to SL DRX at the first time point rather than at a second time point, which is the end of the previously configured active time, and may operate in sleep mode.

For example, a receiving UE may receive first SCI via PSCCH from a transmitting UE in an active time related to SL DRX. Then, the receiving UE may receive second SCI and data via PSSCH from the transmitting UE in the active time related to SL DRX. Here, for example, if, at a first time point, the receiving UE receives information from the transmitting UE that the data is the last transmission, the receiving UE may stop the timer related to SL DRX at the first time point rather than at a second time point, which is the end of the previously configured active time, and may operate in a sleep mode.

For example, a receiving UE may receive first SCI via PSCCH from a transmitting UE in an active time related to SL DRX. Then, the receiving UE may receive second SCI and data via PSSCH from the transmitting UE in the active time related to SL DRX. Here, for example, if, at a first time point, the receiving UE receives information from the transmitting UE indicating that the HARQ buffer related to the data has been flushed, the receiving UE may stop the timer related to SL DRX at the first time point rather than at a second time point, which is the end of the previously configured active time, and may operate in a sleep mode.

For example, a receiving UE may receive first SCI via PSCCH from a transmitting UE in an active time related to SL DRX. Then, the receiving UE may receive second SCI and data via PSSCH from the transmitting UE in the active time related to SL DRX. Here, for example, if the receiving UE receives information related to operating in SL sleep mode from the transmitting UE at a first time point, it may stop the timer related to the SL DRX at the first time point rather than at a second time point, which is the end of the previously configured active time, and operate in the sleep mode.

For example, a receiving UE may receive first SCI via PSCCH from a transmitting UE in an active time related to SL DRX. Then, the receiving UE may receive second SCI and data via PSSCH from the transmitting UE in the active time related to SL DRX. Here, for example, if, at a first time point, the receiving UE receives information from the transmitting UE that stops the timer related to SL DRX, the receiving UE may suspend the timer related to SL DRX at the first time point rather than at a second time point, which is the end of the previously configured active time, and may operate in a sleep mode.

FIG. 11 shows a method of stopping a timer related to an active time by a first device according to an embodiment of the present disclosure. The embodiment of FIG. 11 may be combined with various embodiments of the present disclosure.

Referring to FIG. 11, in step S1110, a first device 100 and a second device 200 may establish a radio resource control (RRC) connection.

In step S1120, a first device 100 may receive, from a second device 200, a sidelink discontinuous reception (SL DRX) configuration including information related to an SL DRX cycle and information related to a timer for an active time.

In step S1130, a first device 100 may start the timer.

In step S1140, a first device 100 may receive, from a second device 200, first sidelink control information (SCI) for scheduling a physical sidelink shared channel (PSSCH) through a physical sidelink control channel (PSCCH), based on a first resource.

In step S1150, a first device 100 may receive, from a second device 200, second SCI and data through the PSSCH, based on the first resource.

For example, the first SCI may include resource allocation information.

For example, the timer may be stopped based on the resource allocation information including only information regarding the first resource.

For example, a first device 100 may stop the timer based on a PDB value related to the data. When receiving the data after transmitting a HARQ NACK for the data, if a PDB value related to the data is not satisfied, a first device 100 may stop the timer.

For example, a first device 100 may stop the timer based on information related to the data being the last transmission. For example, a first device 100 may stop the timer based on at least one of the resource allocation information including only information regarding the first resource or information related to the data being the last transmission.

For example, a first device 100 may stop the timer based on information related to a HARQ buffer being flushed. For example, a first device 100 may stop the timer based on at least one of the resource allocation information including only information regarding the first resource or information related to a HARQ buffer being flushed. Here, for example, a HARQ buffer may be a buffer related to the data.

For example, a first device 100 may stop the timer based on information related to operating in an SL sleep mode. For example, a first device 100 may stop the timer based on at least one of the resource allocation information including only information regarding the first resource or information related to operating in an SL sleep mode.

For example, a first device 100 may stop the timer based on information related to not starting the timer. For example, a first device 100 may stop the timer based on at least one of the resource allocation information including only information regarding the first resource or information related to not starting the timer.

For example, the first resource may include one slot and at least one of a sub-channel.

For example, a transmission for the PSSCH may be determined to be a last transmission, based on the resource allocation information including only the information regarding to the first resource.

For example, a buffer for a hybrid automatic repeat request (HARQ) process related to the PSSCH may be determined to be flushed, based on the resource allocation information including only the information regarding to the first resource.

For example, it may be determined that it is indicated not to start the timer, based on the resource allocation information including only the information regarding to the first resource.

For example, a first device 100 may receive, from a second device 200, information regarding an operating time in sleep mode. For example, the information regarding the operating time in sleep mode may be received through one among SCI, an RRC signaling, or a medium access control (MAC) control element (CE). For example, a time interval during which the timer is stopped may be determined based on the information regarding the operating time in sleep mode.

For example, a first device 100 may receive, from the second device, information representing that a transmission for the PSSCH is a last transmission. For example, the information representing that the transmission for the PSSCH is a last transmission may be determined based on at least one of a PC5 unicast link, a destination, a HARQ process ID, or a sidelink process.

For example, the timer may include at least one of an SL DRX on-duration timer, an SL DRX inactivity timer, an SL DRX HARQ RTT timer, or an SL DRX retransmission timer.

For example, a first device 100 may receive, from the second device, information regarding a sidelink service. For example, the information regarding the sidelink service may include at least one of a PC5 5G Quality of service identifier (PQI) for the sidelink service, a PC5 Quality of service flow identifier (PFI) for the sidelink service, a priority for the sidelink service. For example, the timer may be determined based on information regarding the sidelink service.

The above-described embodiment may be applied to various devices described below. For example, a processor 102 of a first device 100 may control a transceiver 106 to establish a radio resource control (RRC) connection with a second device 200. And, for example, a processor 102 of a first device 100 may control a transceiver 106 to receive, from the second device 200, a sidelink discontinuous reception (SL DRX) configuration including information related to an SL DRX cycle and information related to a timer for an active time. And, for example, a processor 102 of a first device 100 may start the timer. And, for example, a processor 102 of a first device 100 may control a transceiver 106 to receive, from a second device 200, first sidelink control information (SCI) for scheduling a physical sidelink shared channel (PSSCH) through a physical sidelink control channel (PSCCH), based on a first resource. And, for example, a processor 102 of a first device 100 may control a transceiver 106 to receive, from a second device 200, second SCI and data through the PSSCH, based on the first resource.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: establish a radio resource control (RRC) connection with a second device; receive, from the second device, a sidelink discontinuous reception (SL DRX) configuration including information related to an SL DRX cycle and information related to a timer for an active time; start the timer; receive, from the second device, first sidelink control information (SCI) for scheduling a physical sidelink shared channel (PSSCH) through a physical sidelink control channel (PSCCH), based on a first resource; and receive, from the second device, second SCI and data through the PSSCH, based on the first resource. For example, the first SCI may include resource allocation information. For example, the timer may be stopped based on the resource allocation information including only information regarding the first resource.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: establish a radio resource control (RRC) connection with a second UE; receive, from the second UE, a sidelink discontinuous reception (SL DRX) configuration including information related to an SL DRX cycle and information related to a timer for an active time; start the timer; receive, from the second UE, first sidelink control information (SCI) for scheduling a physical sidelink shared channel (PSSCH) through a physical sidelink control channel (PSCCH), based on a first resource; and receive, from the second UE, second SCI and data through the PSSCH, based on the first resource. For example, the first SCI may include resource allocation information. For example, the timer may be stopped based on the resource allocation information including only information regarding the first resource.

According to an embodiment of the present disclosure, a non-transitory computer-readable storage medium storing instructions may be proposed. For example, the instructions, when executed, may cause a first device to: establish a radio resource control (RRC) connection with a second device; receive, from the second device, a sidelink discontinuous reception (SL DRX) configuration including information related to an SL DRX cycle and information related to a timer for an active time; start the timer; receive, from the second device, first sidelink control information (SCI) for scheduling a physical sidelink shared channel (PSSCH) through a physical sidelink control channel (PSCCH), based on a first resource; and receive, from the second device, second SCI and data through the PSSCH, based on the first resource. For example, the first SCI may include resource allocation information. For example, the timer may be stopped based on the resource allocation information including only information regarding the first resource.

Figure 12:
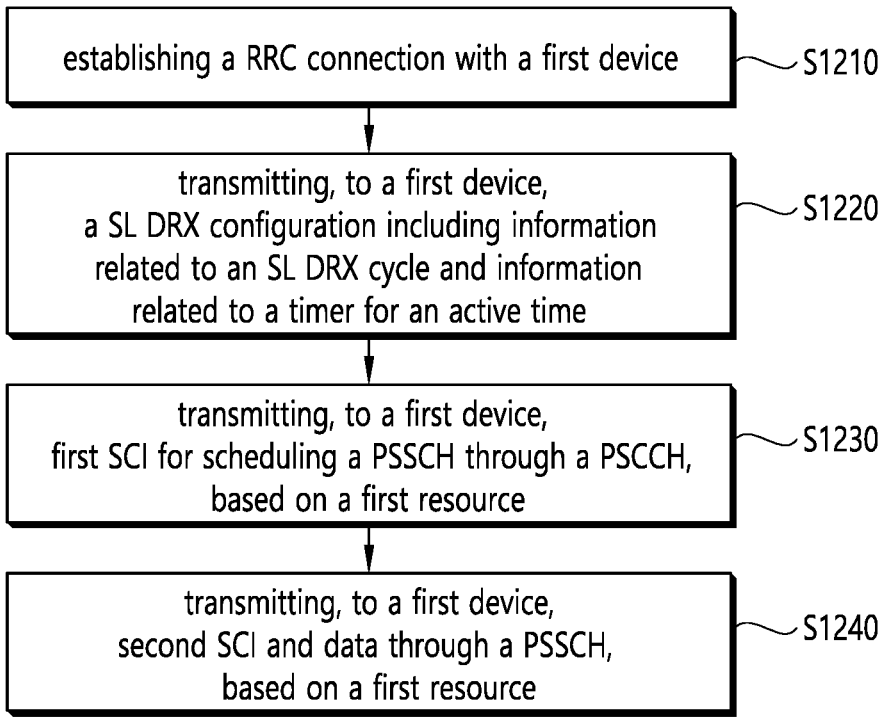
FIG. 12 shows a method in which a second device transmits resource allocation information and stops a timer related to an active time according to an embodiment of the present disclosure.
Figure 14:
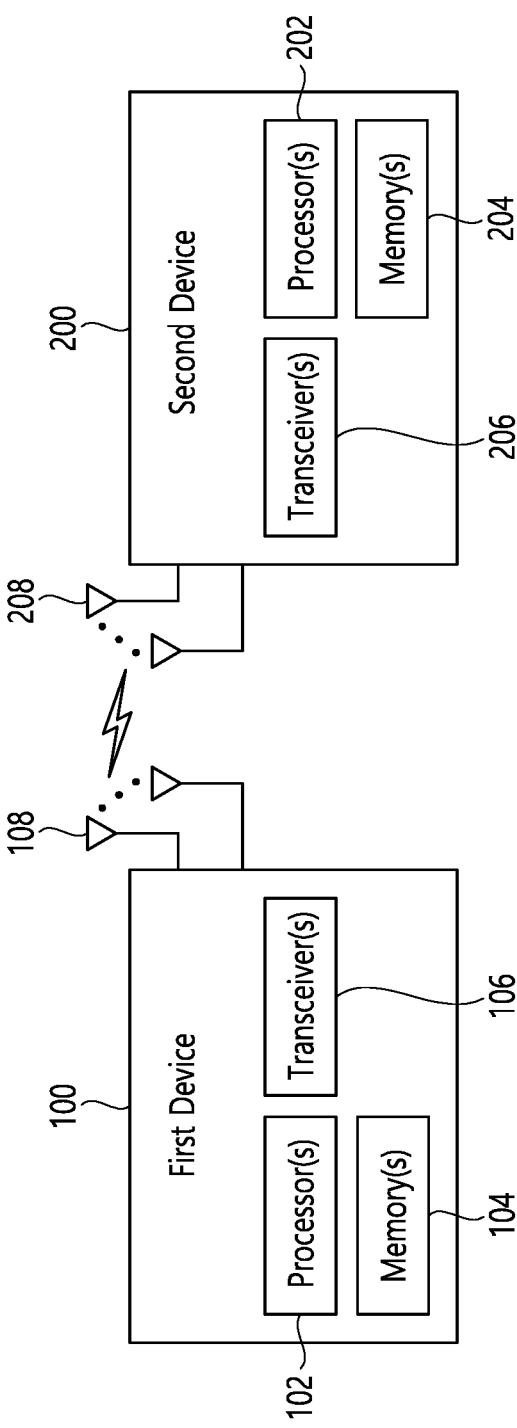
FIG. 14 shows wireless devices, based on an embodiment of the present disclosure.
Figure 15:
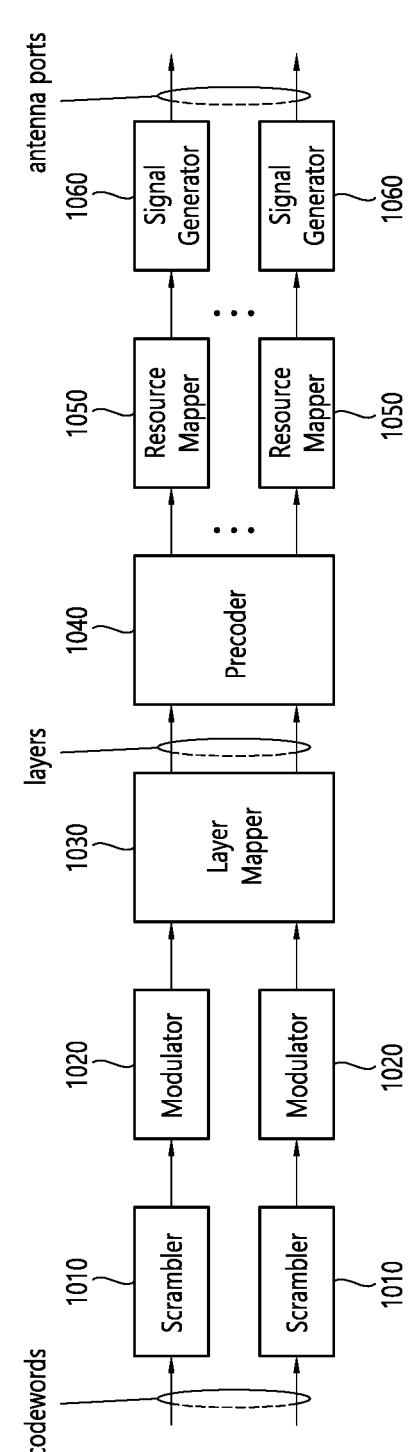
FIG. 15 shows a signal process circuit for a transmission signal, based on an embodiment of the present disclosure.
Figure 16:
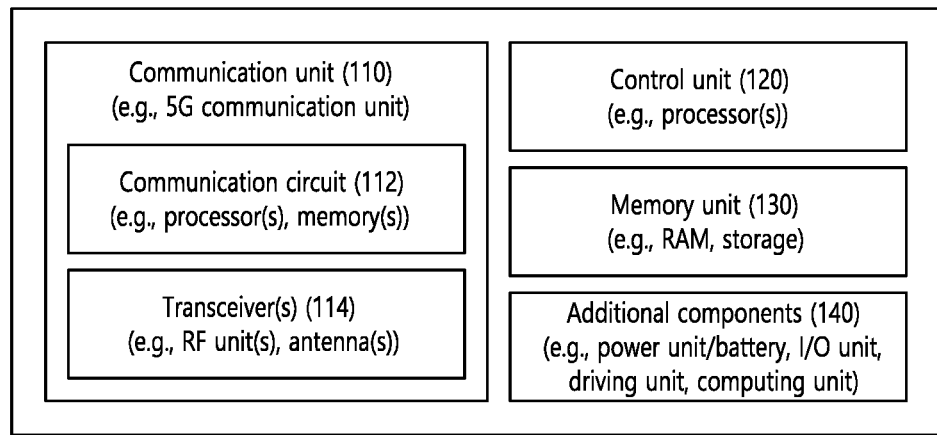
FIG. 16 shows another example of a wireless device, based on an embodiment of the present disclosure.
Figure 17:
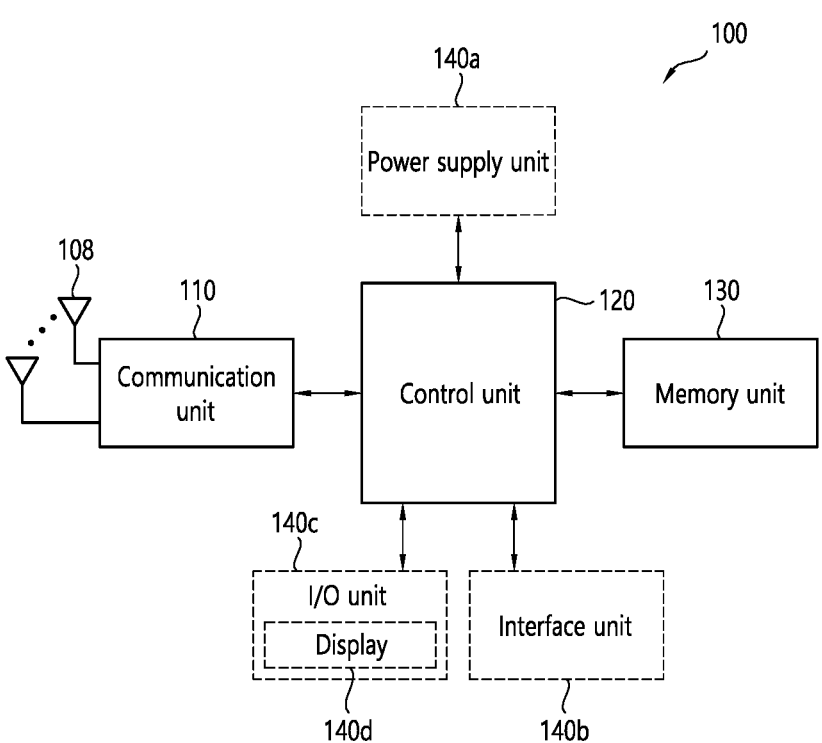
FIG. 17 shows a hand-held device, based on an embodiment of the present disclosure.

FIG. 12 shows a method in which a second device transmits resource allocation information and stops a timer related to an active time according to an embodiment of the present disclosure. The embodiment of FIG. 12 may be combined with various embodiments of the present disclosure.

Referring to FIG. 12, in step S1210, a first device 100 and a second device 200 may establish a radio resource control (RRC) connection.

In step S1220, a second device 200 may transmit, to a first device 100, a sidelink discontinuous reception (SL DRX) configuration including information related to an SL DRX cycle and information related to a timer for an active time. For example, the timer may be started by a first device 100.

In step S1230, a second device 200 may transmit, to a first device 100, first sidelink control information (SCI) for scheduling a physical sidelink shared channel (PSSCH) through a physical sidelink control channel (PSCCH), based on a first resource.

In step S1240, a second device 200 may transmit, to a first device 100, second SCI and data through the PSSCH, based on the first resource.

For example, the first SCI may include resource allocation information.

For example, the timer may be stopped by a first device 100, based on the resource allocation information including only information regarding the first resource.

For example, the first resource may include one slot and at least one of a sub-channel.

For example, a transmission for the PSSCH may be determined to be a last transmission, based on the resource allocation information including only the information regarding to the first resource.

For example, a buffer for a hybrid automatic repeat request (HARQ) process related to the PSSCH may be determined to be flushed, based on the resource allocation information including only the information regarding to the first resource.

For example, it may be determined that it is indicated not to start the timer, based on the resource allocation information including only the information regarding to the first resource.

For example, a second device 200 may transmit, to a first device 100, information regarding an operating time in sleep mode. For example, the information regarding the operating time in sleep mode may be received through one among SCI, an RRC signaling, or a medium access control (MAC) control element (CE). For example, a time interval during which the timer is stopped may be determined based on the information regarding the operating time in sleep mode.

For example, a second device 200 may transmit, to a first device 100, information representing that a transmission for the PSSCH is a last transmission. For example, the information representing that the transmission for the PSSCH is a last transmission may be determined based on at least one of a PC5 unicast link, a destination, a HARQ process ID, or a sidelink process.

For example, the timer may include at least one of an SL DRX on-duration timer, an SL DRX inactivity timer, an SL DRX HARQ RTT timer, or an SL DRX retransmission timer.

For example, a second device 200 may transmit, from a first device 100, information regarding a sidelink service. For example, the information regarding the sidelink service may include at least one of a PC5 5G Quality of service identifier (PQI) for the sidelink service, a PC5 Quality of service flow identifier (PFI) for the sidelink service, a priority for the sidelink service. For example, the timer may be determined based on information regarding the sidelink service.

The above-described embodiment may be applied to various devices described below. For example, a processor 202 of a second device 200 may control a transceiver 206 to establish a radio resource control (RRC) connection with a first device 100. And, for example, a processor 202 of a second device 200 may control a transceiver 206 to transmit, to a first device 100, a sidelink discontinuous reception (SL DRX) configuration including information related to an SL DRX cycle and information related to a timer for an active time. And, for example, a processor 202 of a second device 200 may control a transceiver 206 to transmit, to a first device 100, first sidelink control information (SCI) for scheduling a physical sidelink shared channel (PSSCH) through a physical sidelink control channel (PSCCH), based on a first resource. And, for example, a processor 202 of a second device 200 may control a transceiver 206 to transmit, to a first device 100, second SCI and data through the PSSCH, based on the first resource.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: establish a radio resource control (RRC) connection with a first device; transmit, to the first device, a sidelink discontinuous reception (SL DRX) configuration including information related to an SL DRX cycle and information related to a timer for an active time, wherein the timer is started by the first device; transmit, to the first device, first sidelink control information (SCI) for scheduling a physical sidelink shared channel (PSSCH) through a physical sidelink control channel (PSCCH), based on a first resource; and transmit, to the first device, second SCI and data through the PSSCH, based on the first resource. For example, the timer may be stopped by a first device 100, based on the resource allocation information including only information regarding the first resource.

Various embodiments of the present disclosure may be combined with each other.

Various embodiments of the present disclosure may be implemented independently. Alternatively, various embodiments of the present disclosure may be implemented in combination or merged with each other. For example, various embodiments of the present disclosure have been described based on a 3GPP system for convenience of description, but various embodiments of the present disclosure may be extendable to systems other than the 3GPP system. For example, various embodiments of the present disclosure are not limited to direct UE-to-UE communication, but may also be used in uplink or downlink, where a base station, relay node, or the like may use the proposed methods according to various embodiments of the present disclosure. For example, information regarding whether a method according to various embodiments of the disclosure applies may be defined to be communicated by a base station to a UE, or by a second device 200 to a receiving UE, via a predefined signal (e.g., physical layer signal or higher layer signal). For example, information regarding rules according to various embodiments of the present disclosure may be defined to be communicated by a base station to a UE, or by a second device 200 to a receiving UE, via a predefined signal (e.g., a physical layer signal or a higher layer signal).

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 18 shows a communication system 1, based on an embodiment of the present disclosure. The embodiment of FIG. 18 may be combined with various embodiments of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1)

LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 19 shows wireless devices, based on an embodiment of the present disclosure. The embodiment of FIG. 19 may be combined with various embodiments of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 20 shows a signal process circuit for a transmission signal, based on an embodiment of the present disclosure. The embodiment of FIG. 20 may be combined with various embodiments of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDS CH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 21 shows another example of a wireless device, based on an embodiment of the present disclosure. The wireless device may be implemented in various forms according to a use-case/service (refer to FIG. 18). The embodiment of FIG. 21 may be combined with various embodiments of the present disclosure.

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof Hereinafter, an example of implementing FIG. 21 will be described in detail with reference to the drawings.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 22 may be combined with various embodiments of the present disclosure.

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 23 may be combined with various embodiments of the present disclosure.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information regarding a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
establishing, by a first device, a radio resource control (RRC) connection with a second device;
receiving, by the first device from the second device, a sidelink discontinuous reception (SL DRX) configuration including information related to an SL DRX cycle and information related to a timer for an active time;
starting, by the first device, the timer;
receiving, by the first device from the second device, first sidelink control information (SCI) for scheduling a physical sidelink shared channel (PSSCH) through a physical sidelink control channel (PSCCH), based on a first resource; and
receiving, by the first device from the second device, second SCI and data through the PSSCH, based on the first resource,
wherein the first SCI includes resource allocation information,
wherein the timer is stopped based on the resource allocation information including only information regarding the first resource, and wherein a buffer for a hybrid automatic repeat request (HARQ) process related to the PSSCH is flushed, based on the resource allocation information including only the information regarding the first resource.

2. The method of claim 1, wherein the first resource includes one slot and at least one of a sub-channel.

3. The method of claim 1, wherein a transmission for the PSSCH is determined to be a last transmission, based on the resource allocation information including only the information regarding the first resource.

4. The method of claim 1, wherein it is determined that it is indicated not to start the timer, based on the resource allocation information including only the information regarding the first resource.

5. The method of claim 1, further comprising:
receiving, by the first device from the second device, information regarding an operating time in sleep mode.

6. The method of claim 5, wherein the information regarding the operating time in sleep mode is received through one among SCI, an RRC signaling, or a medium access control (MAC) control element (CE).

7. The method of claim 5, wherein a time interval during which the timer is stopped is determined based on the information regarding the operating time in sleep mode.

8. The method of claim 1, further comprising:
receiving, by the first device from the second device, information representing that a transmission for the PSSCH is a last transmission.

9. The method of claim 8, wherein the information representing that the transmission for the PSSCH is a last transmission is determined based on at least one of a PC5 unicast link, a destination, a HARQ process ID, or a sidelink process.

10. The method of claim 1, wherein the timer includes at least one of an SL DRX on-duration timer, an SL DRX inactivity timer, an SL DRX HARQ round trip time (RTT) timer, or an SL DRX retransmission timer.

11. The method of claim 1, further comprising:
receiving, by the first device from the second device, information regarding a sidelink service.

12. The method of claim 11, wherein the information regarding the sidelink service includes at least one of a PC5 5G Quality of service identifier (PQI) for the sidelink service, a PC5 Quality of service flow identifier (PFI) for the sidelink service, or a priority for the sidelink service.

13. A first device comprising:
at least one transceiver;
at least one processor; and
at least one memory connected to the at least one processor and storing instructions that, based on being executed, cause the first device to perform operations comprising:
establishing a radio resource control (RRC) connection with a second device;

receiving, from the second device, a sidelink discontinuous reception (SL DRX) configuration including information related to an SL DRX cycle and information related to a timer for an active time;
starting the timer;
receiving, from the second device, first sidelink control information (SCI) for scheduling a physical sidelink shared channel (PSSCH) through a physical sidelink control channel (PSCCH), based on a first resource; and
receiving, from the second device, second SCI and data through the PSSCH, based on the first resource,
wherein the first SCI includes resource allocation information,
wherein the timer is stopped based on the resource allocation information including only information regarding the first resource, and
wherein a buffer for a hybrid automatic repeat request (HARQ) process related to the PSSCH is flushed, based on the resource allocation information including only the information regarding the first resource.

14. A device adapted to control a first user equipment (UE), the device comprising:
at least one transceiver;
at least one processor; and
at least one memory connected to the at least one processor and storing instructions that, based on being executed, cause the first UE to perform operations comprising:
establishing a radio resource control (RRC) connection with a second UE;
receiving, from the second UE, a sidelink discontinuous reception (SL DRX) configuration including information related to an SL DRX cycle and information related to a timer for an active time;
starting the timer;
receiving, from the second UE, first sidelink control information (SCI) for scheduling a physical sidelink shared channel (PSSCH) through a physical sidelink control channel (PSCCH), based on a first resource; and
receiving, from the second UE, second SCI and data through the PSSCH, based on the first resource,
wherein the first SCI includes resource allocation information,
wherein the timer is stopped based on the resource allocation information including only information regarding the first resource, and
wherein a buffer for a hybrid automatic repeat request (HARQ) process related to the PSSCH is flushed, based on the resource allocation information including only the information regarding the first resource.

* * * * *